United States Patent
Li et al.

(10) Patent No.: US 11,032,419 B2
(45) Date of Patent: *Jun. 8, 2021

(54) INTELLIGENT CUSTOMER SERVICE SYSTEMS, CUSTOMER SERVICE ROBOTS, AND METHODS FOR PROVIDING CUSTOMER SERVICE

(71) Applicant: SHANGHAI XIAOI ROBOT TECHNOLOGY CO., LTD., Shanghai (CN)

(72) Inventors: Siyuan Li, Shanghai (CN); Pinpin Zhu, Shanghai (CN)

(73) Assignee: Shanghai Xiaoi Robot Technology Co., Ltd., Shanghai (CN)

( * ) Notice: Subject to any disclaimer, the term of this patent is extended or adjusted under 35 U.S.C. 154(b) by 30 days.

This patent is subject to a terminal disclaimer.

(21) Appl. No.: 16/043,415

(22) Filed: Jul. 24, 2018

(65) Prior Publication Data

US 2018/0332170 A1    Nov. 15, 2018

Related U.S. Application Data

(63) Continuation of application No. 15/390,172, filed on Dec. 23, 2016, now Pat. No. 10,063,702.

(30) Foreign Application Priority Data

Dec. 30, 2015  (CN) .......................... 201511024389.4
Dec. 30, 2015  (CN) .......................... 201511025278.5

(51) Int. Cl.
*H04M 1/64* (2006.01)
*H04M 3/51* (2006.01)
*G06Q 30/00* (2012.01)

(52) U.S. Cl.
CPC ....... *H04M 3/5166* (2013.01); *H04M 3/5183* (2013.01); *G06Q 30/016* (2013.01); *H04M 2203/408* (2013.01); *H04M 2250/74* (2013.01)

(58) Field of Classification Search
CPC ............ H04M 3/5166; H04M 3/5183; H04M 2250/74; H04M 2203/408; G06Q 30/016
See application file for complete search history.

(56) References Cited

U.S. PATENT DOCUMENTS 5,960,070 A * 9/1999 O'Donovan .......... H04M 15/00
                                                    379/114.01
6,539,079 B1 * 3/2003 Crockett ............... H04M 3/428
                                                    379/142.08

(Continued)

FOREIGN PATENT DOCUMENTS

CN    103279528 A    9/2013
CN    104731895 A    6/2015

OTHER PUBLICATIONS

Office Action dated Mar. 20, 2018 in corresponding Chinese Application No. 2015-11024389.4.

(Continued)

*Primary Examiner* — Solomon G Bezuayehu
(74) *Attorney, Agent, or Firm* — Morgan, Lewis & Bockius LLP

(57) ABSTRACT

The present disclosure includes an intelligent customer service system comprising a customer end, a customer service robot, and a human customer-service end. The customer service robot is configured to: receive a session message from the customer end; identify content of the session message; determine whether it is capable of processing the session message based on the identified content; if so, obtain an answer message matching the identified content from pre-stored service resource and transmit the answer message to the customer end; or otherwise, set its (Continued)

state to a session suspended state, obtain a comforting answer message matching the session message from the pre-stored service resource, send the comforting answer message to the customer end, and transmit to the human customer-service end the session message that the customer service robot is not capable of processing or the content of which the customer service robot cannot identify.

13 Claims, 13 Drawing Sheets

(56) References Cited

U.S. PATENT DOCUMENTS

| | | | | |
|---|---|---|---|---|
| 2002/0077815 A1* | 6/2002 | Zhang | ................ | H04M 3/4936 |
| | | | | 704/251 |
| 2006/0256949 A1* | 11/2006 | Noble, Jr. | ........... | H04M 3/5231 |
| | | | | 379/265.01 |
| 2007/0027918 A1* | 2/2007 | Kawakami | ........... | G06Q 10/107 |
| 2007/0198272 A1* | 8/2007 | Horioka | ................ | G10L 15/22 |
| | | | | 704/275 |
| 2007/0263838 A1* | 11/2007 | Wiseman | ........... | H04M 3/5166 |
| | | | | 379/265.02 |
| 2007/0280433 A1* | 12/2007 | Milstein | ........... | H04M 3/53341 |
| | | | | 379/67.1 |
| 2008/0084971 A1* | 4/2008 | Dhanakshirur | ..... | H04M 3/2227 |
| | | | | 379/88.01 |
| 2008/0091412 A1* | 4/2008 | Strope | .................. | G10L 15/197 |
| | | | | 704/10 |
| 2010/0023331 A1* | 1/2010 | Duta | ..................... | G10L 15/063 |
| | | | | 704/257 |
| 2013/0007505 A1* | 1/2013 | Spear | .................. | G06F 11/2025 |
| | | | | 714/4.11 |
| 2014/0025383 A1* | 1/2014 | Dai | ......................... | G10L 25/63 |
| | | | | 704/260 |
| 2014/0122618 A1* | 5/2014 | Duan | ..................... | H04L 51/02 |
| | | | | 709/206 |
| 2014/0358890 A1* | 12/2014 | Chen | .................. | G06F 16/3329 |
| | | | | 707/710 |
| 2015/0358463 A1* | 12/2015 | O'Connor | ........... | H04M 3/5166 |
| | | | | 379/88.02 |
| 2016/0099892 A1* | 4/2016 | Palakovich | ............. | H04L 51/02 |
| | | | | 709/206 |
| 2016/0358094 A1* | 12/2016 | Fan | .................... | G06F 16/24578 |
| 2017/0206328 A1* | 7/2017 | Mizoguchi | ............ | G06F 40/232 |

OTHER PUBLICATIONS

Office Action dated Mar. 20, 2018 in corresponding Chinese Application No. 2015-11025278.5.

* cited by examiner

INTELLIGENT CUSTOMER SERVICE SYSTEMS, CUSTOMER SERVICE ROBOTS, AND METHODS FOR PROVIDING CUSTOMER SERVICE

CROSS-REFERENCE TO RELATED APPLICATION

This application is a continuation of applicant's U.S. application. Ser. No. 15/390,172, which was filed on Dec. 23, 2016 and claims the benefit of priority to Chinese Patent Application No. 201511024389.4 filed on Dec. 30, 2015, and Chinese Patent Application No. 201511025278.5 filed on Dec. 30, 2015. All of the above patent applications are incorporated herein in their entirety by reference.

TECHNICAL FIELD

The present disclosure generally relates to a computer technology field, and more particularly, to intelligent customer service systems, customer service robots, and methods for providing customer service by the customer service robots.

BACKGROUND

With rapid development of Internet and strengthening of service consciousness, network customer service providers are widely applied to all aspects of life, particularly, to many aspects of routine commercial service.

Generally, a customer service system comprises a customer service robot and a human customer-service end or interface. The customer service robot may include a real-time communication tool based on a webpage, while the human customer-service end may include a real-time communication tool embedded in a webpage. Each human customer-service end is managed by a human customer service representative. During a customer service process, if a session message is received from a customer, a customer service robot provides customer service first. If the customer thinks that the customer service robot cannot solve a problem raised in the session message, the customer may select a human customer-service interface manually to seek the help from a customer service representative.

In practice, the customer service robot identifies the session message input by a customer, searches data matching the session message in pre-stored resource data, and sends the matched data as a response to the customer. To a same question raised by the customer, the customer service robot may repeat a same answer mechanically, which may irritate the customer and harm the customer experience. Besides, as a customer service representative cannot be on-line all the time and always communicates with a plurality of customers at the same time, the customer service representative may not be able to reply to the customer in time. Therefore, the conventional customer service system hardly meets service demands of customers, and impacts the customers' user experience negatively.

SUMMARY

The present disclosure includes an exemplary intelligent customer service system, an exemplary customer service robot, and an exemplary method for providing customer service by the customer service robot. An exemplary intelligent customer service system in accordance with the present disclosure comprises: at least one customer end; a customer service robot; and at least one human customer-service end. The at least one customer end is configured to receive a question from a customer and transmit a session message including the question. The customer service robot is configured to: establish a session with the at least one customer end; receive the session message; identify content of the session message; determine whether the customer service robot is capable of processing the session message based on the identified content of the session message; upon determining that the customer service robot is capable of processing the session message, obtain an answer message matching the identified content of the session message from pre-stored service resource and transmit the answer message to the customer end; and upon determining that the customer service robot is not capable of processing the session message or cannot identify the content of the session message, set a state of the customer service robot in a session service with the customer end to be a session suspended state, obtain a comforting answer message matching the session message from the pre-stored service resource, send the comforting answer message to the customer end, and transmit the session message that the customer service robot is not capable of processing or the content of which the customer service robot cannot identify. The at least one human customer-service end is configured to: establish the session with the at least one customer end through the customer service robot, receive from the customer service robot the session message that the customer service robot is not capable of processing or the content of which the customer service robot cannot identify, receive from a customer service representative an answer message matching the received session message, and transmit the answer message to the at least one customer end through the customer service robot.

An exemplary customer service robot for providing customer service in accordance with the present disclosure comprises: a first message interactor to receive a session message from a customer end, and send an answer message matching content of the session message to the customer end; a state detector, coupled to first message interactor, to determine a state of the customer service robot in a session service with the customer end, after the first message interactor receives the session message from the customer end; a session message processor, coupled to the first message interactor and the state detector, to process the session message received from the customer end and control the first message interactor to send the answer message to the customer end, if the state detector determines that the customer service robot is not in a session suspended state; a state controller, coupled to the session message processor, to set the state of the customer service robot in the session service with the customer end to be the session suspended state, if a predetermined condition for session suspension is met during the processing of the session message by the session message processor; and a second message interactor, coupled to the first message interactor and a human customer-service end, to: if the state detector determines that the customer service robot is in the session suspended state, send the received session message to the human customer-service end, and transmit an answer message received from the human customer-service end to the customer end through the first message interactor.

An exemplary method for providing customer service by a customer service robot in accordance with the present disclosure comprises: establishing a session with between the customer service robot and a customer end; receiving, at the customer service robot, a session message from a customer end; identifying, at the customer service robot, content of the received session message; determining whether the customer service robot is capable of processing the received session message based on the identified content of the received session message; upon determining that the customer service robot is capable of processing the received session message, obtaining, at the customer service robot, an answer message matching the identified content of the received session message from pre-stored service resource and transmitting the answer message to the customer end, the pre-stored service resource including language experience data and customer service resource data; and upon determining that the customer service robot is not capable of processing the received session message or cannot identify the content of the received session message, setting a state of the customer service robot in a session service with the customer end to be a session suspended state, obtaining a comforting answer message matching the session message from the pre-stored service resource, transmitting the comforting answer message to the customer end, and transmitting to a human customer-service end the received session message that the customer service robot is not capable of processing or the content of which the customer service robot cannot identify.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Devices, systems, and methods for providing customer service, according to embodiments of the present disclosure, are provided herein to address the above described needs.

Figure 1:
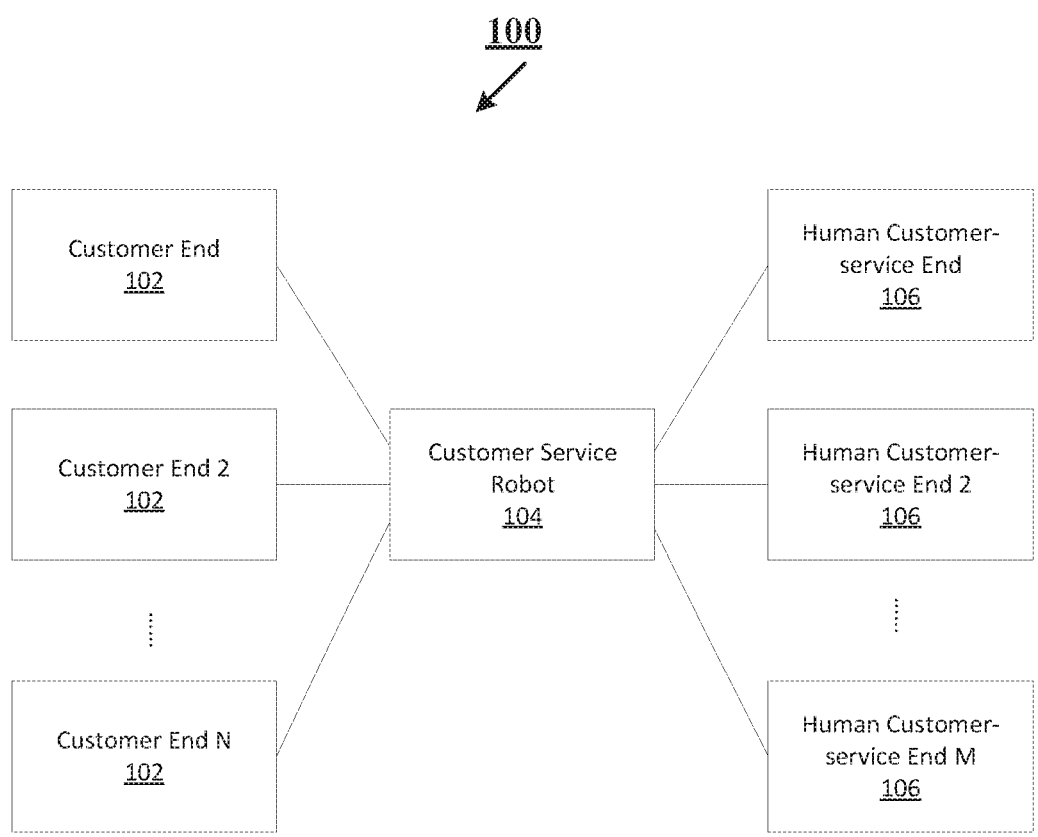
FIG. 1 illustrates an exemplary intelligent customer service system consistent with embodiments of the present disclosure.

FIG. 1 illustrates an exemplary intelligent customer service system 100, consistent with embodiments of the present disclosure. In some embodiments, as shown in FIG. 1, customer service system 100 may include one or more customer end 102, a customer service robot 104, and one or more human customer-service end 106. Customer end 102 is coupled to customer service robot 104, which is in turn coupled to human customer-service end 106.

Customer end 102 may be a hardware device such as a computer, a PDA, a cell phone, a laptop, a tablet, a desktop, or any computing device running one or more computer programs to provide an interface for a customer user to submit a customer service request message such as a session message. Through customer end 102, the user can input a session message and interact with customer service robot 104, via text, voice, image, or video.

The session message can be a text, a voice, an image, a video, or a combination thereof. In some embodiments, the voice session message may be converted into text. In some embodiments, the session message may be in many forms. For example, the session message may be a sentence consisting of words in a natural language. A customer may describe an object using the sentence consisting of words in the natural language. In some embodiments, if the described object is a product, the session message may be a message for inquiring related information of the product, such as a size, a shape, a color, a texture, a production date or an expiration date of the product, or a message for inquiring after-sales service of the product. In some embodiments, if the described object is a service, the session message may be a message for inquiring related information of the service, such as content of the service, a time period of the service, announcements of the service or service staff providing the service. In some embodiments, the form of the session message may be a voice, an image or a video. For example, the customer may have a session with a custom service provider by a voice, an instant audio conversation, or a video conversation. In some embodiments, the customer may have a session with the custom service provider using a picture through the customer end. In some embodiments, the picture may be a static picture having semantic information, a dynamic picture having semantic information or a combination thereof, or a photo or screenshot information of a product or a serving object which the session message from the customer end aims at. In some embodiments, the customer may send a link containing a product or a serving object through the session message.

It should be noted that, in some embodiments, the session message may include at least one of followings: a sentence consisting of words in a natural language, a link, a voice, an image, or a video. In some embodiments, the image may include at least one of followings: a static or dynamic picture having semantic information, or a photo or screenshot information of a product or a serving object which the session message aims at. In some embodiments, the form of the session message may include at least two of the followings: a sentence consisting of words in a natural language, a data link, a voice, an image, or a video. For example, the customer may have a session with the customer service provider by voice or video, and meanwhile send a link to the customer service provider through the customer end. Further details will be described below.

Customer service robot 104, also called a "virtual customer assistant," may be a hardware device such as a robot, a computer, a PDA, a cell phone, a laptop, a tablet, a desktop, or any computing device running one or more computer programs. The computer program running on robot 104 may include, for example, a real-time communication application (e.g., an instant messenger such as Facebook Messenger, Google Chat, MSN Messenger, Yahoo! Messenger, QQ, Wechat, etc.) or a real-time communication application based on a webpage. Robot 104 receives a customer service request message such as a session message from a customer, and provide an answer (if any) to the request message. Further details will be described below.

Human customer-service end 106 may be a hardware device such as a computer, a PDA, a cell phone, a laptop, a tablet, a desktop, or any computing device running one or more computer programs to provide an interface for a human customer service representative (also called "human customer assistant") to handle a customer service request message such as a session message received via customer service robot 104. When customer service robot 104 does not have an answer to the message. The computer program running on human customer-service end 106 may include a real-time communication application embedded in a webpage. Further details will be described below.

In some embodiments, customer end 102 and human customer-service end 106 each may be embedded in a program of a browser and run automatically when the browser is detected to be opened or run. In some embodiments, customer end 102 and human customer-service end 106 each may be an independent application running on a computing device, such as a desktop, a tablet computer, a mobile phone, or a vehicle-mounted terminal, and can be activated and run by operation of a user. In some embodiments, customer end 102 and human customer-service end 106 each may be embedded in a customized device provided by a product or service provider. The customized device may be used for inquiry and feedback between the customer and the product or service provider during an exhibition procedure or a service experiencing procedure. It should be understood that customer end 102 and human customer-service end 106 may have a same form or different forms, as long as they communicate with each other using a same communication protocol (or different communication protocols, in some embodiments) and establish a customer-service session.

Customer end 102, customer service robot 104, and human customer-service end 106 may be connected through wired or wireless communication means. In some embodiments, customer service robot 104 and human customer-service end 106 may be located in one computing device. In other embodiments, they may be located on two or more computing devices connected via wide area networks (WANs), local area networks (LANs), wireless networks, or any combination thereof.

In some embodiments, customer service robot 104 and the human customer service representative work cooperatively. Customer service robot 104 receives session messages from customer end 102, determines whether the robot itself is in a session suspended state. If so, robot 104 transmits session messages to human customer-service end 106. That is, the customer service representative at human customer-service end 106 provides customer service for a customer at customer end 102. If customer service robot 104 determines that it is not in the session suspended state, robot 104 processes the session message by itself. During the processing, if a predetermined condition for session suspension is met, a state of the robot is switched to the session suspended state. That is, customer service robot 104 provides customer service for the customer at the customer end, and when the predetermined condition is met, it automatically switches to a state that a customer service representative provides customer service for the customer. In this way, the customer service representative and the customer service robot can work cooperatively to provide consistent and high quality of customer services to the customer.

In some embodiments, customer service robot 104 may have sessions with a plurality of customer ends 102, and forward session messages received from the customer ends to a plurality of human customer-service ends 106. If the plurality of customer ends and the plurality of human customer-service ends are in a session state, and the customer service robot cannot process a session message from a particular customer end by itself or cannot identify the session message from the particular customer end, the customer service robot may send, according to task loads of the plurality of human customer-service ends in the session state, the session message from the particular customer end and a comforting (or pacifying) answer message matching the session message to one of the plurality of human customer-service ends 106 that has the fewest tasks, so that the customer may obtain a response as early as possible. For example, in some embodiments, one human customer service representative monitors and manages one of ten human customer-service ends 106, respectively. The customer service robot may reasonably allocate received session messages to each of the ten human customer-service ends 106, according to the number of customer ends corresponding to session messages that each human customer-service ends 106 is processing.

In some embodiments, when a plurality of customer ends 102 and a plurality of human customer-service ends 106 are in a session state, and customer service robot 104 is not capable of processing a session message from a particular customer end by itself or cannot identify the session message from the particular customer end, the customer service robot may send the session message to one of the plurality of human customer-service ends, which has processed any session message from the particular customer end before, according to record of session messages. In this way, the customer service robot can provide the customer with consistent services and improve the efficiency of the customer service. In some embodiments, the customer service robot may send a comforting answer message matching the session message which the customer service robot is not capable of processing by itself or cannot identify, along with the session message to the one of the plurality of human customer-service ends. In this way, a human customer service representative at the one of the plurality of human customer-service ends can know a communication situation about the customer, and experience of the customer may not be affected.

It should be understood that, customer service robot 104 may forward session messages to human customer-service ends 106 in consideration of various allocation methods according to practical requirements. Priorities may be set based on the various allocation methods. During the forwarding process, the session messages may be allocated to the human customer-service ends according to the priority order.

Figure 2:
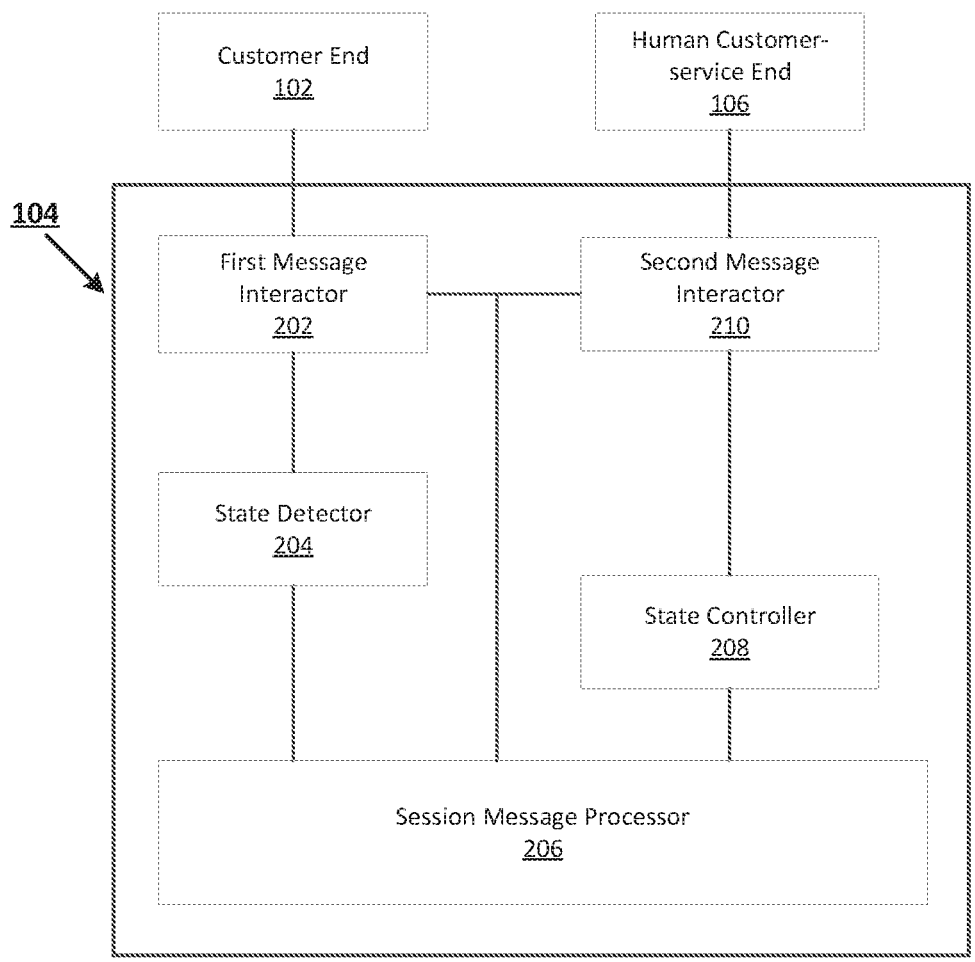
FIG. 2 illustrates a block diagram of an exemplary embodiment of a customer service robot consistent with embodiments of the present disclosure.

FIG. 2 illustrates a block diagram of an exemplary embodiment of a customer service robot 104 of FIG. 1, consistent with embodiments of the present disclosure. In some embodiments, customer service robot 104 may include a first message interactor 202, a state detector 204, a session message processor 206, a state controller 208 and a second message interactor 210.

First message interactor 202 can be a computer program or a hardware computing device running one or more computer programs to receive a customer service request message such as a session message from a customer end 102. It may also send an answer message matching content of the session message to the customer end. The answer message may include a pacifying or comforting answer message when a state of customer service robot 104 in a session service with the customer end is a session suspended state.

State detector 204 can be a computer program or a hardware computing device running one or more computer programs to detect or determine a state of the customer service robot 104 in a session service with a customer end 102, after first message interactor 202 receives a session message from the customer end. In some embodiments, state detector 204 may further trigger session message processor 206 to identify content of the session message if the detected state of the customer service robot 104 is not a session suspended state.

Session message processor 206 can be a hardware computing device running one or more computer programs to: if the state detector 204 determines that the customer service robot 104 is not in a session suspended state, process the session message received from the customer end by itself and instruct the first message interactor 202 to send the answer message to the customer end. Specifically, session message processor 206 identifies content of the session message received by first message interactor 202, and determines whether customer service robot 104 is capable of processing the session message by itself based on the identified content of the session message. Upon determining that customer service robot 104 itself is capable of processing the session message, session message processor 206 obtains an answer message matching the identified content of the session message from service resource stored in a database. Session message processor 206 may obtain a comforting (or pacifying) answer message matching the identified content of the session message from the service resource stored in the database when the state of customer service robot 104 in the session service with the customer end is set to be the session suspended state by state controller 208.

The comforting answer message represents a message which may eliminate uneasiness and negative emotion of the customer and make the customer in a stable mood. The comforting answer message may be presented by words in a natural language, a picture, a voice, or a piece of music. In some embodiments, the comforting answer message may represent a status that a customer service representative at the human customer-service end is searching for an answer to the session message. A process of sending the customer the comforting answer message representing a status that the customer service representative is searching for an answer to the session message, and a process of the customer service representative searching and providing a solution for the content of the session message are performed at the same time. On one hand, it may reflect an actual state of customer service representative and there is no need for the customer service representative to input anything manually. Thus, a time period of answering for the customer service representative may be saved, and the customer may be pacified or comforted. On the other hand, the customer service representative may have more time to focus and solve the question raised by the customer, so that it is more quickly to provide a satisfactory answer to the customer.

In some embodiments, the comforting answer message, as well as the session message when customer service robot 104 itself is not capable of processing or cannot identify, are sent to a human customer-service end 106, so that a human customer service representative can see detailed content of the comforting answer message the customer service robot sends to the customer end. In this way, a human customer service representative can make sure to provide coherent and consistent answers to the customer end, which would further improve consistent service experience and user experience of the customer.

Figure 3A:
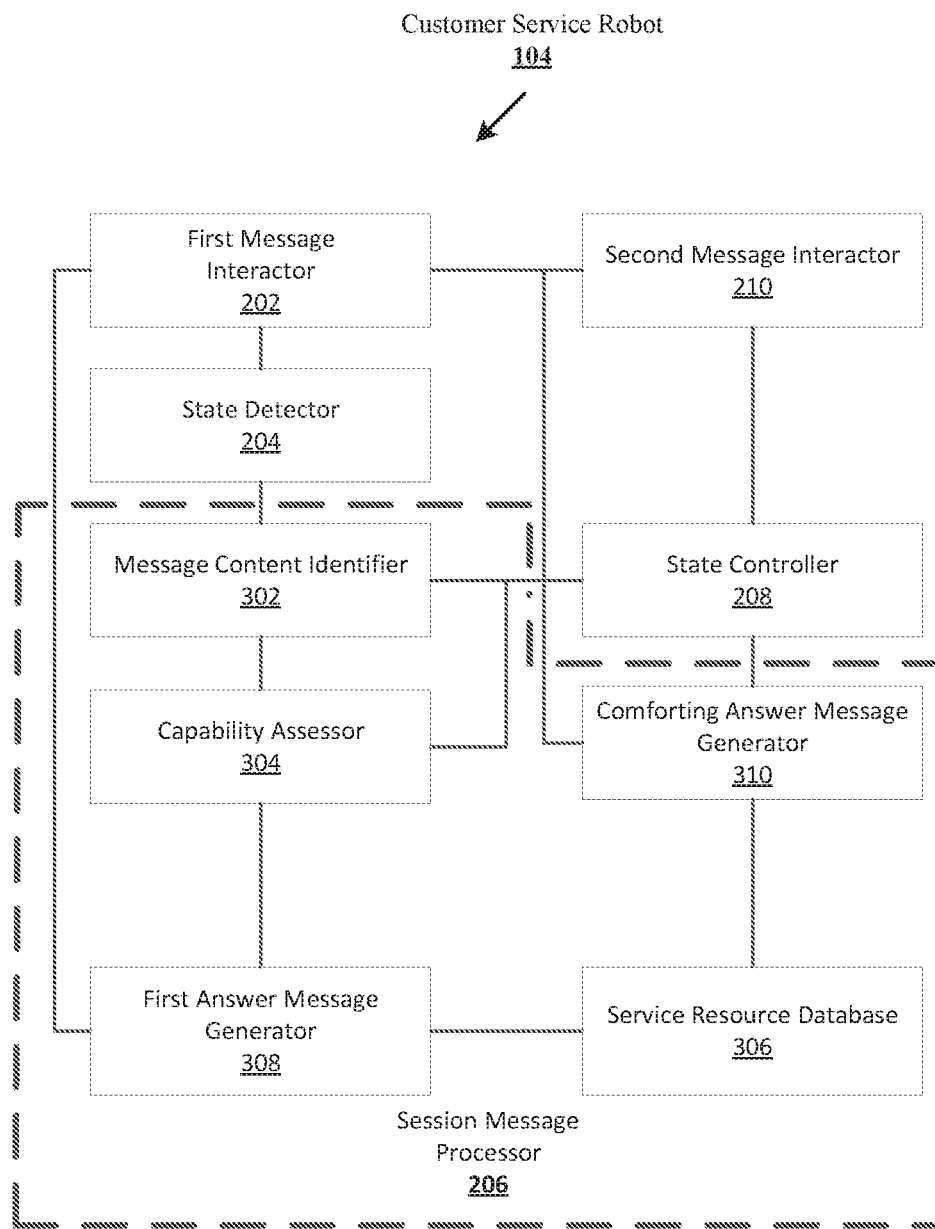
FIGS. 3A-3C each illustrate a block diagram of an exemplary embodiment of a session message processor of a customer service robot, consistent with embodiments of the present disclosure.

FIG. 3A illustrates a block diagram of an exemplary session message processor 206 of a customer service robot 104, consistent with embodiments of the present disclosure. In some embodiments, as shown in FIG. 3, session message processor 206 may include a message content identifier 302, a capability assessor 304, a service resource database 306, a first answer message generator 308, and a comforting answer message generator 310. In some embodiments, message content identifier 302 is coupled to capability assessor 304, which is coupled to first answer message generator 308. Further, first answer message generator 308 and a comforting answer message generator 310 are coupled to service resource database 306. In some embodiments, message content identifier 302, capability assessor 304, and comforting answer message generator 310 are coupled to state controller 208 to provide or obtain information for setting a state of customer service robot 104 in a session service with customer end 102.

Message content identifier 302 can be a computer program or a hardware computing device running one or more computer programs to identify the content of the session message received by first message interactor 202. In some embodiments, message content identifier 302, coupled to state detector 204, identifies the content of the session message when state detector 204 determines that customer service robot 104 is not in a session suspended state. In some embodiments, message content identifier 302 can identify the content of the session message using different identification methods according to the form of the session message. For example, message content identifier 302 may identify a sentence consisting of words in a natural language based on word segments and semantic identification. For another example, message content identifier 302 may convert a received voice into a text, and divide the text into word segments to be performed with semantic identification. For yet another example, if the session message contains an image, message content identifier 302 may extract words or patterns in the image and identify the extracted words or patterns.

Capability assessor 304 can be a computer program or a hardware computing device running one or more computer programs to determine whether customer service robot 104 is capable of processing the session message by itself based on the content of the session message identified by message content identifier 302.

Service resource database 306 can be a storage device storing a structured collection of records or data of service resource. In some embodiments, service resource may include language experience data, customer service resource data, etc. Service resource database 306 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk. Also, the structured collection stored therein can be organized as a set of queues, a structured file, a relational database, an object-oriented database, or any other appropriate database. Computer software, such as a database management system, may be utilized to manage and provide access to the data stored therein.

First answer message generator 308 can be a computer program or a hardware computing device running one or more computer programs to obtain, from the service resource stored in service resource database 306, an answer message matching the identified content of the session message. In some embodiments, generator 308 obtains the answer if capability assessor 304 determines that customer service robot 104 is capable of processing the session message by itself.

Comforting answer message generator 310 can be a computer program or a hardware computing device running one or more computer programs to obtain, from the service resource stored in the service resource database 306, a comforting (or pacifying) answer message matching the identified content of the session message. In some embodiments, generator 310 obtains the comforting answer message when the state of the customer service robot 104 in a session service with the customer end is set to be a session suspended state by the state controller 208. Generator 310 transmits the comforting message to the customer end through the first message interactor 202. In some embodiments, generator 310 also transmits the comforting message to human customer-service end 106 so a customer service representative can provide an answer message consistent with the comforting message.

In some embodiments, to further improve the cooperation of the customer service robot and the customer service representative and relieve anxiousness of the customer during a waiting process, message content identifier 302 may identify the content of the session message received by the first message interactor 202 from the customer end, when the customer service robot 50 is in the session suspended state in the session service with the customer end, and the second message interactor 210 doesn't receive any session message from the customer service representative end. Comforting answer message generator 310 may obtain the comforting answer message matching the content of the session message from the service resource stored in the service resource database 306 according to the content of the session message identified by the message content identifier.

Referring back to FIG. 2, state controller 208 can be a computer program or a hardware computing device running one or more computer programs to set a state of customer service robot 104 in a session service with customer end 102. In some embodiments, in order to save processing resource of the customer service robot and to realize seamless cooperation of the customer service robot and a customer service representative, a state of the customer service robot under the condition that the customer service robot is capable of processing the received session message by itself may be set to a session state or a non-session-suspended state, and a state of the customer service robot under the condition that the customer service robot is not capable of processing the received session message by itself or cannot identify content of the received session message may be set to a session suspended state.

State controller 208 can set the state as a session suspended state if session message processor 206 determines that customer service robot 104 is not capable of processing the session message by itself or session message processor 206 cannot identify the session message. In some embodiments, state controller 208 may return the state of customer service robot 104 in the session service with the customer end to be the session state, if the session between the customer end and the human customer-service end is determined to be finished. That is, when the customer service representative finishes intervening, state controller 208 switches back to a state that the customer service robot serves the customer.

In some embodiments, state controller 208 may switch the state of the customer service robot 104 to be the session suspended state and control second message interactor 210 to transmit session messages between the customer end and the customer service representative end, if the customer service robot 104 is in the session state in the session service with the customer end and second message interactor 210 receives a session message from the customer service representative end. Based on the above controlling of state controller 208, during the cooperation of the customer service representative and the customer service robot, the customer service representative may have a higher priority than that of the customer service robot, and intervene actively at any time if necessary, to provide better service for the customer.

The second message interactor 210 can be a computer program or a hardware computing device running one or more computer programs to send to a human customer-service end 106 the session message received by the first message interactor 202 from customer end 102 when the customer service robot 104 is in a session suspended state. Interactor 210 also sends an answer message received from the human customer-service end to the customer end through the first message interactor 202. In some embodiments, second message interactor 210 may send the comforting answer message, along with the session message that customer service robot 104 is not capable of processing by itself or cannot identify, to the human customer-service end. In this way, the customer service representative can see detailed content of the comforting answer message customer service robot 104 sends to the customer end. The customer service representative can accordingly retain coherence and consistency of answers sent to the customer end, which further improves consistent service experience and user experience of the customer.

With the above embodiments of customer service robot 104, when receiving a session message from a customer end and being not in a session suspended state, customer service robot 104 identifies the content of the session message and determines whether it is capable of processing the session message by itself. If it is determined that the customer service robot is not capable of processing the session message by itself or cannot identify the session message, the state of the customer service robot in the session service with the customer end is set to be the session suspended state, which may save processing resource of the customer service robot. Besides, the comforting answer message matching the content of the session message is sent to the customer end in time, which may avoid the customer's anxiousness caused by lacking a reasonable response. And the session message that the customer service robot cannot process by itself or cannot identify is sent to the human customer-service end without manual selection by the customer. Therefore, when the customer service robot cannot process the session message effectively, the customer service representative may intervene timely to effectively solve problems from the customer.

In some embodiments, when the customer service robot is in the session suspended state, if no session message is received from the human customer-service end (i.e., the customer service representative does not intervene to process the session message), the customer service robot identifies the content of the session message, and obtains the comforting answer message matching the content of the session message from the pre-stored service resource if the content of the session message can be identified. Besides, during the interaction between the customer service representative and the customer, the customer service robot may not identify, process, or answer the session message by itself, but only transmits session messages between the human customer-service end and the customer end. This may further improve the cooperation of the customer service robot and the customer service representative, and relieve anxiousness of the customer during a waiting process.

In some embodiments, upon determining that it is capable of processing the session message by itself, customer service robot 104 obtains an answer message matching the content of the session message from pre-stored service resource and sends it to the customer end, which enables a customer to obtain an effective response in time. That is, on one hand, when in a session suspended state, the customer service robot only transmits the session message (to a customer service representative) without processing it, which may save service resource of the customer service robot. On the other hand, the customer service robot only works to provide an answer to the customer when it is not in the session suspended state. Thus, during the cooperative work process of the customer service representative and the customer service robot, based on the cooperation of the state controller and the second message interactor, the priority of the customer service representative may be higher than that of the customer service robot. The customer service representative may intervene actively based on practical requirements, to provide better service to the customer. As a result, the customer may enjoy consistent service experience, and the customer service robot and the customer service representative can work cooperatively to solve problems for a customer effectively and timely. The customer may not feel any difference between the customer service robot and the customer service representative, and acquire effective comfort during a process of waiting for the answer message, which may ensure better interaction experience. The effectiveness of customer service provided by the customer service system and user experience of customers may be improved.

Figure 3B:
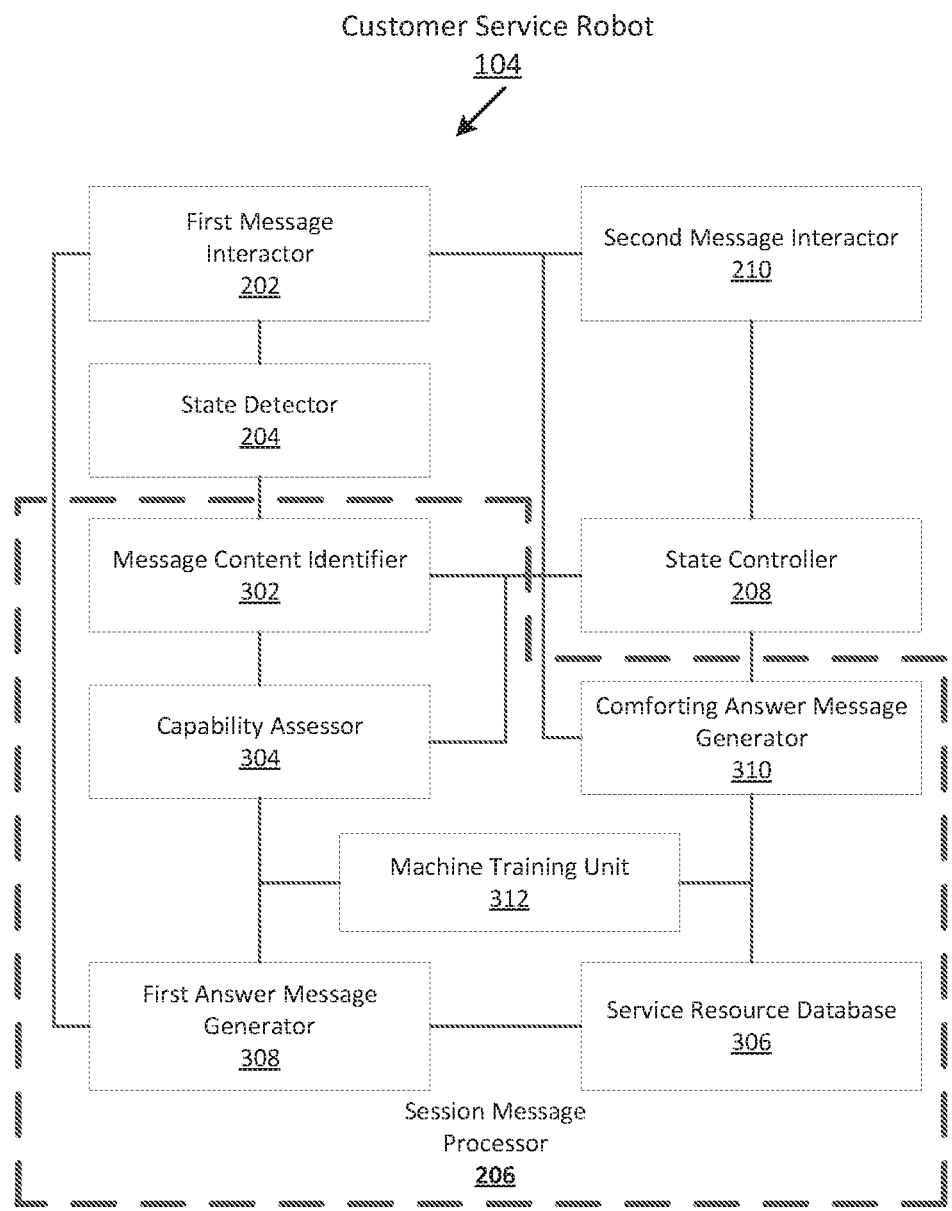

In some embodiments, customer service robot 104 may further include a machine training unit 312, as shown in FIG. 3B, which illustrates a block diagram of another exemplary session message processor 206 of a customer service robot 104. Machine training unit 312 can be a computer program or a hardware computing device running one or more computer programs to perform machine training for big data to customer service robot 104, so that customer service robot 104 is capable of identifying a type of scenario which the session message belongs to. The identified type of scenario is one of a plurality of types of scenarios, which can be obtained by classifying session messages between customer service robot 104 and customer end 102 according to scenarios.

Customer service robot 104 is trained with big data, so that the type of a scenario that the session message belongs to can be identified. Based on the identified type of the scenario, customer service robot 104 can rapidly determine whether it is capable of processing the session message by itself and may perform subsequent processing. This may increase a response speed of the customer service and further improve interaction experience of the customer.

Figure 3C:
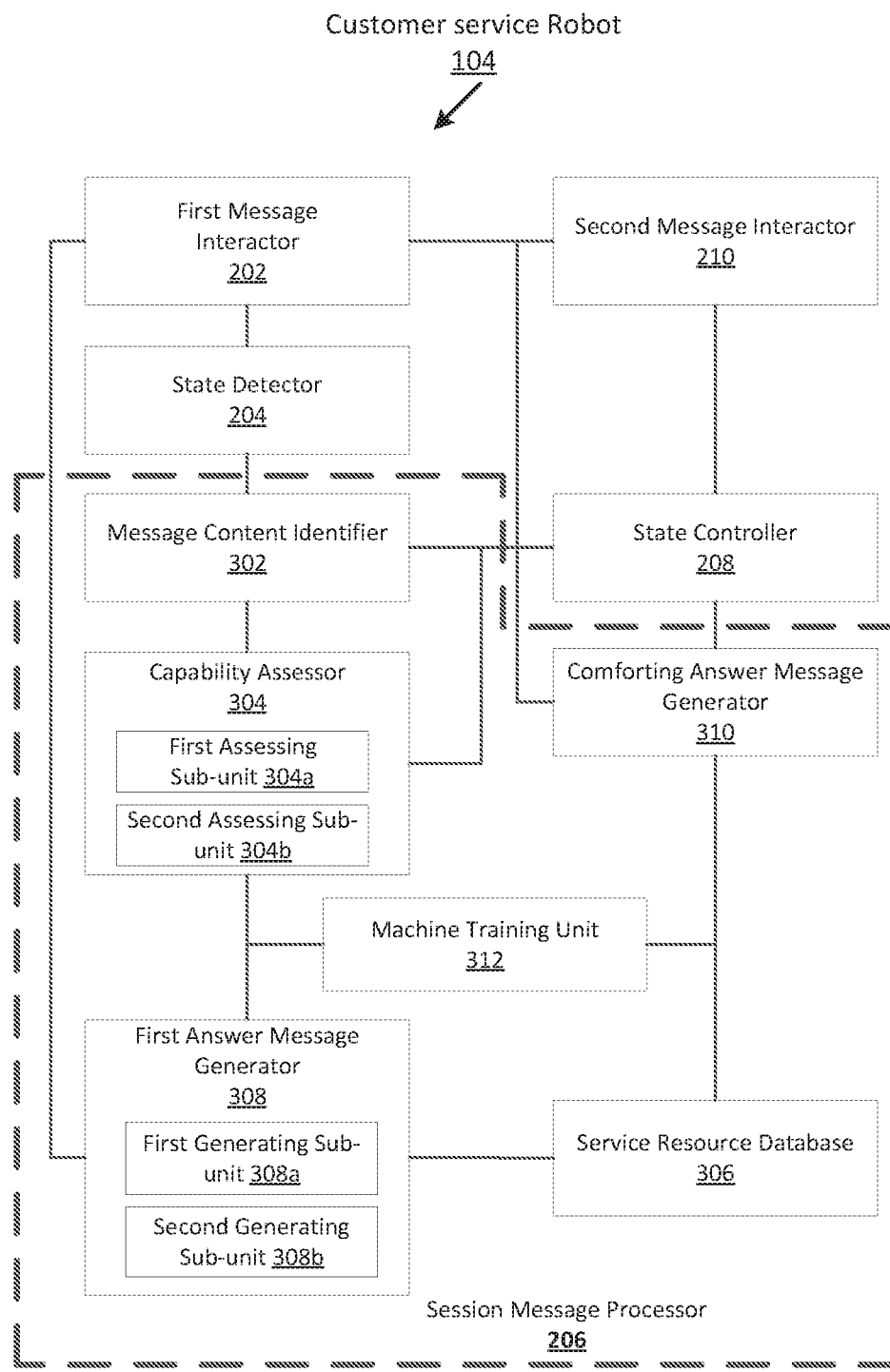

In some embodiments, as shown in FIG. 3C, which illustrates a block diagram of yet another exemplary session message processor 206 of a customer service robot 104, capability assessor 304 may include a first assessing sub-unit 304a and a second assessing sub-unit 304b. First assessing sub-unit 304a can be a computer program or a hardware computing device running one or more computer programs to determine whether customer service robot 104 is capable of answering the content of the session message according to the language experience data by itself. Second assessing sub-unit 304b can be a computer program or a hardware computing device running one or more computer programs to determine a type of scenario to which the content of the session message belongs, if first assessing sub-unit 304a determines that customer service robot 104 is not capable of answering the content of the session message according to the language experience data by itself.

In some embodiments, as shown in FIG. 3C, first answer message generator 308 may include a first generating sub-unit 308a and a second generating sub-unit 308b. First generating sub-unit 308a can be a computer program or a hardware computing device running one or more computer programs to obtain an answer message matching the content of the session message from the language experience data stored in service resource database 306, if it is determined that customer service robot 104 is capable of answering the session message according to the language experience data by itself. Second generating sub-unit 308b can be a computer program or a hardware computing device running one or more computer programs to obtain the answer message, which matches the content of the session message and belongs to the same type of scenario as that for the content of the session message, from the customer service resource data stored in service resource database 306, if it is determined that customer service robot 104 is not capable of answering the session message according to the language experience data by itself.

With the above embodiments of customer service robot 104, if the customer service robot is capable of answering the session message according to the language experience data by itself, the customer service robot obtains an answer message matching content of a session message from the language experience data. If the customer service robot is not capable of answering the session message according to the language experience data by itself, the customer service robot obtains an answer message, which matches the content of the session message and belongs to the same scenario as that of the content of the session message, from the customer service resource data. Therefore, the customer service robot may answer the session message based on not only the language experience data but also the customer service resource data. As the matched customer service resource data and the content of the session message belong to the same scenario, the answer messages the customer service robot can provide may be broader and more accurate.

Figure 4A:
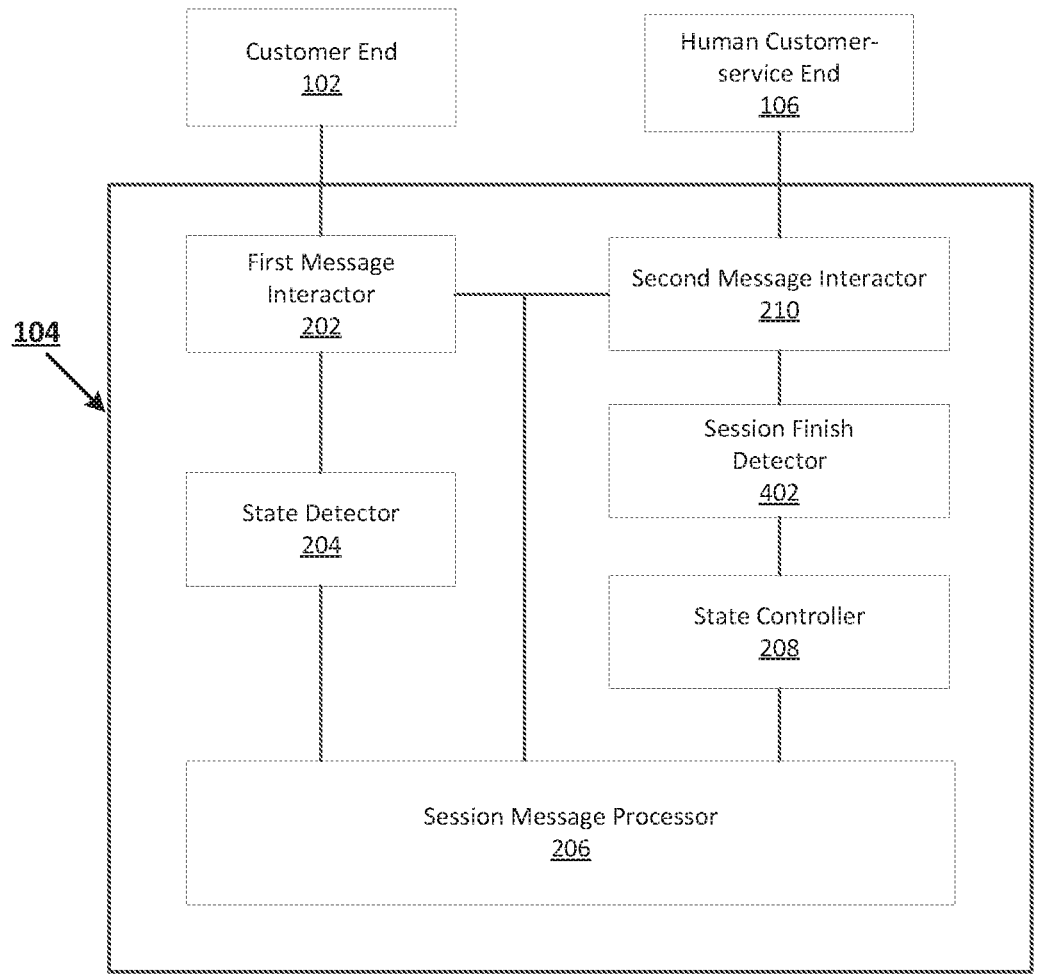
FIGS. 4A-4B each illustrate a block diagram of another exemplary embodiment of a customer service robot consistent with embodiments of the present disclosure.

FIG. 4A illustrates a block diagram of another exemplary embodiment of a customer service robot 104 consistent with embodiments of the present disclosure. In some embodiments, as shown in FIG. 4A, customer service robot 104 may further include a session finish detector 402, in addition to those components disclosed in FIG. 2.

Session finish detector 402 may be a computer program or a hardware computing device running one or more computer programs to determine whether the session between the customer end and the human customer-service end is finished. State controller 208 may return the state of customer service robot 104 in the session service with the customer end to be the session state, if the session between the customer end and the human customer-service end is determined to be finished.

If determining that the session between the customer end and the human customer-service end is finished, the customer service robot returns its state in the session service with the customer end to be the session state. That is, when the customer service representative finishes intervening, the customer service robot switches back to a state that the customer service robot serves the customer. In this way, transition between the customer service representative and the customer service robot without perceived pass is realized, which may further improve service experience of the customer.

Figure 4B:
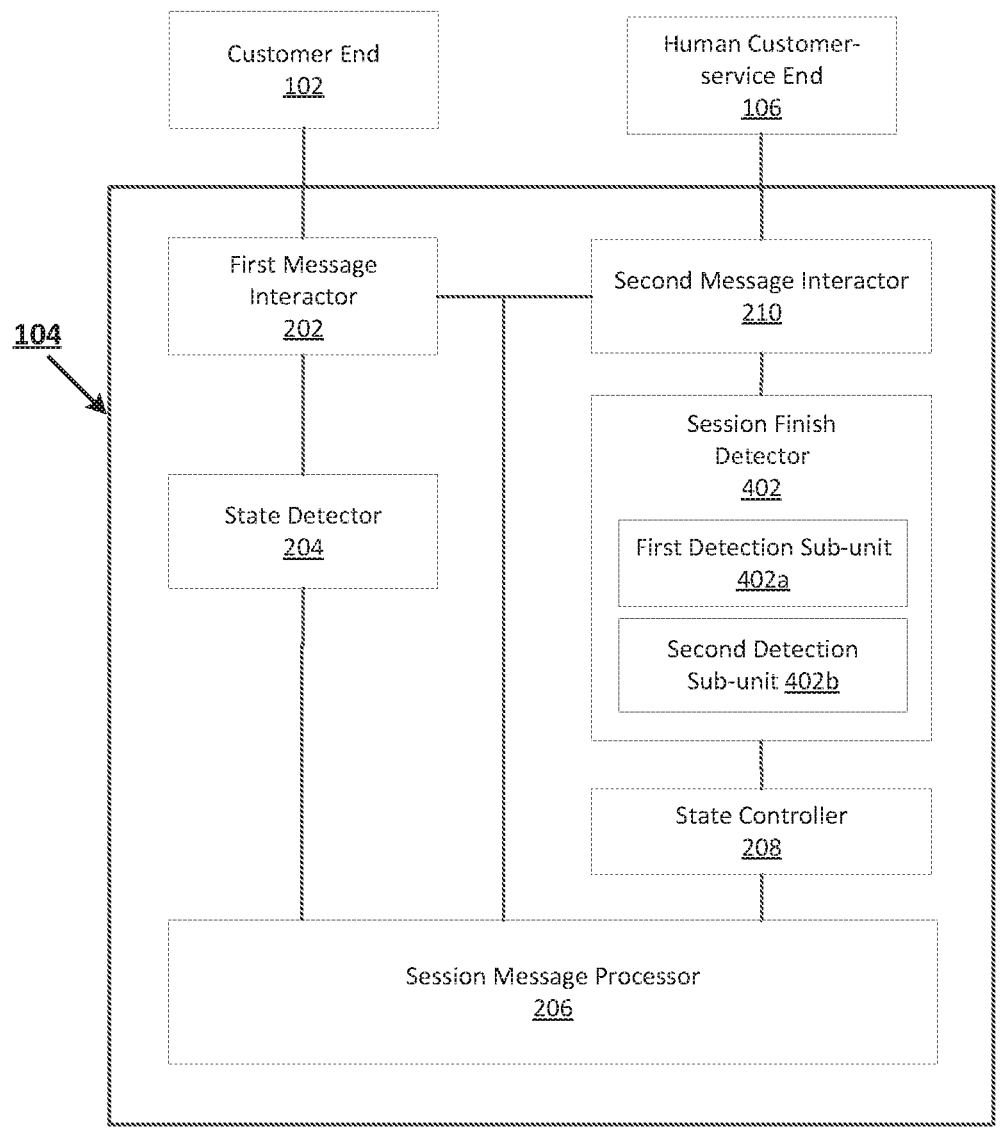

In some embodiments, as shown in FIG. 4B that illustrates a block diagram of another exemplary embodiment of customer service robot 104, session finish detector 402 may include a first detection sub-unit 402a and a second detection sub-unit 402b. First detection sub-unit 402a can be a computer program or a hardware computing device running one or more computer programs to determine whether an idle time period of second message interactor 210 reaches a predetermined duration, and determine the session between the customer end and the human customer-service end to be finished if the idle time period reaches the predetermined duration. Second detection sub-unit 402b can be a computer program or a hardware computing device running one or more computer programs to detect a session finish signal from the human customer-service end, and determine the session between the customer end and the human customer-service end to be finished if the session finish signal is detected.

Customer service robot 104 may determine that the customer service representative has finished intervening, based on first detection sub-unit 402a determining the time period within which no session message is transmitted between the customer service representative end and the customer end reaches the predetermined duration. In some embodiments, customer service robot 104 may determine that the customer service representative has finished intervening, based on second detection sub-unit 402b detecting from the customer service representative end a session finish signal that is sent by the customer service representative end when a session window is closed or when a session message sent by the customer service representative end contains content indicating the session is finished. In this way, it may reduce operation workload of the customer service representative and provide convenience for the customer service representative.

The illustrated configurations of the customer service system and customer service robot 104 in each of FIGS. 1-4B are exemplary only. And persons of ordinary skill in the art will appreciate that the various illustrated elements may be provided as discrete elements or be combined, and be provided as any combination of hardware and software.

Figure 5:
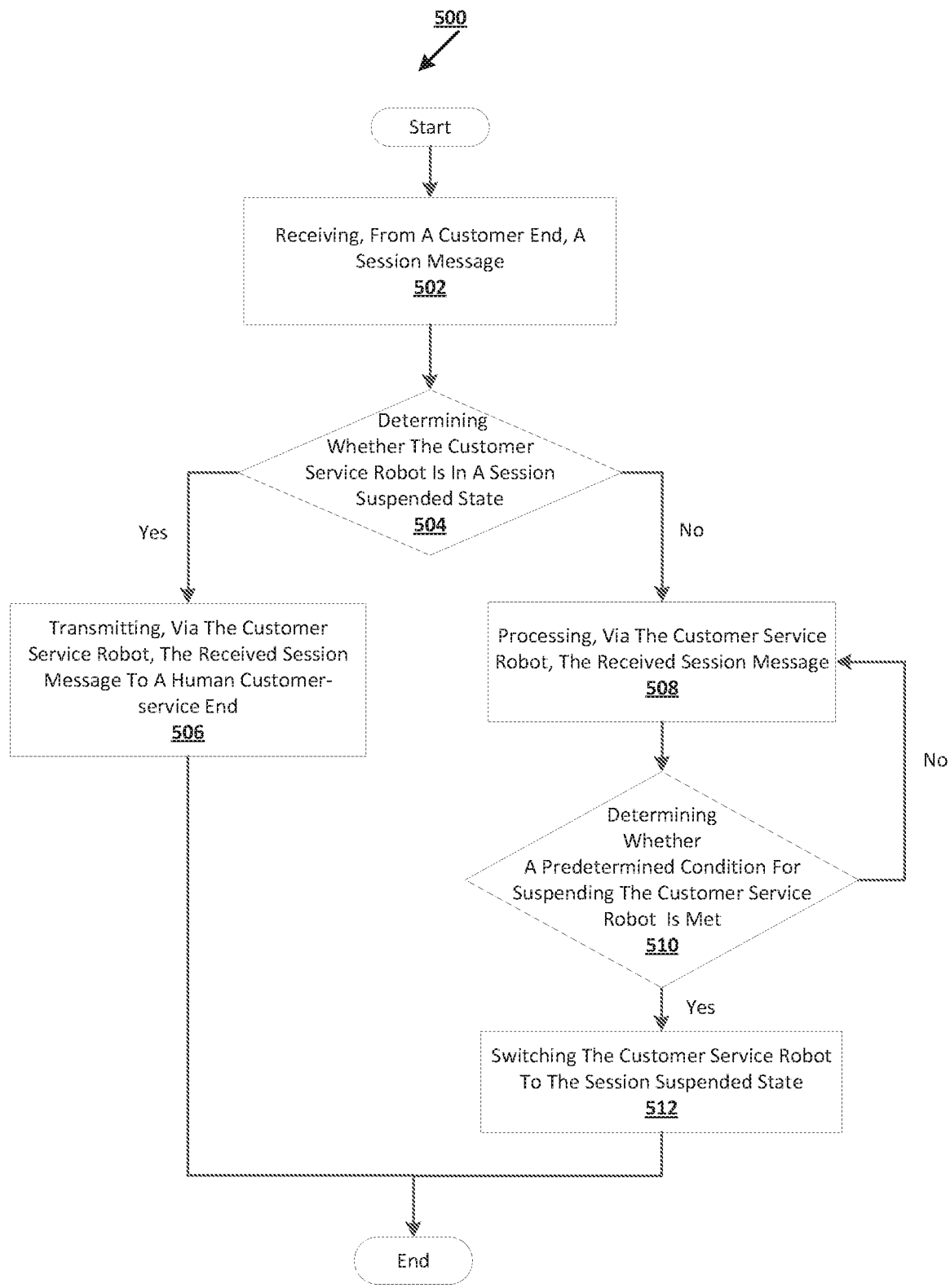
FIG. 5 illustrates a flowchart of an exemplary embodiment of a method for providing customer service by a customer service system consistent with embodiments of the present disclosure.

FIG. 5 illustrates a flowchart of an exemplary method 500 for providing customer service by a customer service system, consistent embodiments of the present disclosure. In some embodiments, as shown in FIG. 5, at step 502, a customer service robot 104 receives a session message from a customer end.

At step 504, the customer service robot determines its state in a session service with the customer end. If it is determined that the customer service robot is in a session suspended state, the customer service robot proceeds to step 506. Or, if it is determined that the customer service robot is not in the session suspended state, the customer service robot proceeds to step 508.

In some embodiments, in order to save processing resource of the customer service robot and to realize seamless cooperation of the customer service robot and a customer service representative, the customer service robot may set its state under the condition that the customer service robot is capable of processing the received session message by itself to a session state or a non-session-suspended state. And the customer service robot may set its state under the condition that the customer service robot is not capable of processing the received session message by itself or cannot identify content of the received session message to a session suspended state.

Figure 6:
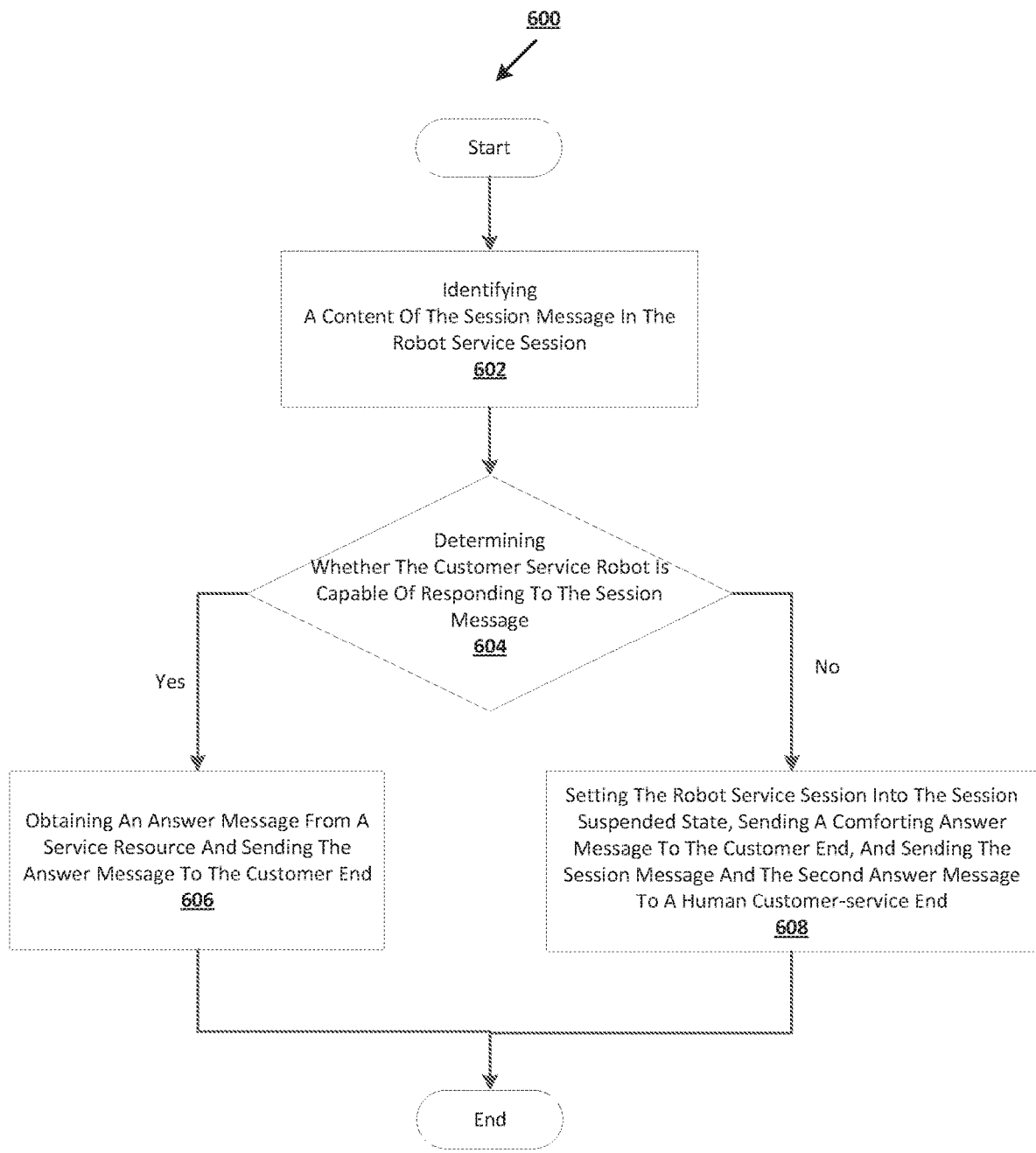
FIG. 6 illustrates a flow chart of an exemplary method for a customer service robot to process a session message received from a customer end, consistent with embodiments of the present disclosure.

At step 506, the customer service robot transmits the received session messages to a human customer-service end. At step 508, the customer service robot processes the received session message by itself. FIG. 6 illustrates a flow chart of an exemplary method for customer service robot 104 to process the received session message by itself.

In some embodiments, as shown in FIG. 6, at step 602, customer service robot 104 may identify content of the received session message. At step 604, the customer service robot 104 may determine whether it is capable of processing the received session message based on the content of the session message.

At step 606, the customer service robot may obtain an answer message from a service resource and sending the answer message to the customer end, if it is determined that customer service robot is capable of processing the session message.

At step 608, the customer service robot may set the robot service session into a session suspended state, generate and send to the customer end a comforting answer message, if it is determined that customer service robot is not capable of processing the session message. In some embodiments, if the customer service robot is able to identify the content of the received session message, it may obtain the comforting answer message matching the content of the received session message from a pre-stored service resource. In some embodiments, the customer service robot may generate or obtain a default comforting answer message, if the customer service robot is not able to identify the content of the received session message.

For example, the comforting answer message may be "Hold on please," "Your request is being handled," "Still working on it," or the like. The comforting answer message may help eliminating uneasiness and negative emotion of the customer and make the customer in a stable mood. The comforting answer message may be presented by words in a natural language, a picture, a voice or a piece of music.

In some embodiments, the customer service robot may also transmit the session message along with the comforting answer message to a human customer-service end, if it is determined that the customer service robot is not capable of processing the received session message or cannot identify the content of the received session message. In this way, a human customer service representative can see the detailed content of the comforting answer message the customer service robot has sent to the customer end. Thus, the customer service representative can provide the customer end with answers coherent and consistent with the comforting answer message. This would further improve consistent service experience and user experience for the customer.

Referring back to FIG. 5, at step 510, the customer service robot determines whether a predetermined condition for session suspension is met. If yes, the customer service robot proceeds to step 512; or else, it proceeds to step 508.

At step 512, the customer service robot switches its state to a session suspended state. In some embodiments, during processing the received session message by the customer service robot itself, if the customer service robot determines that the predetermined condition for session suspension is met, it switches its state to a session suspended state. For example, if it is determined that the customer service robot is not capable of processing the received session message by itself or identifying content of the session message, the customer service robot may perform the following steps: setting the state of the customer service robot in the session service with the customer end to be the session suspended state; obtaining a comforting answer message matching the content of the session message from a pre-stored service resource; sending the comforting answer message to the customer end; and sending to the human customer-service end the session message, which the customer service robot is not capable of processing by itself or cannot identify.

Figure 7:
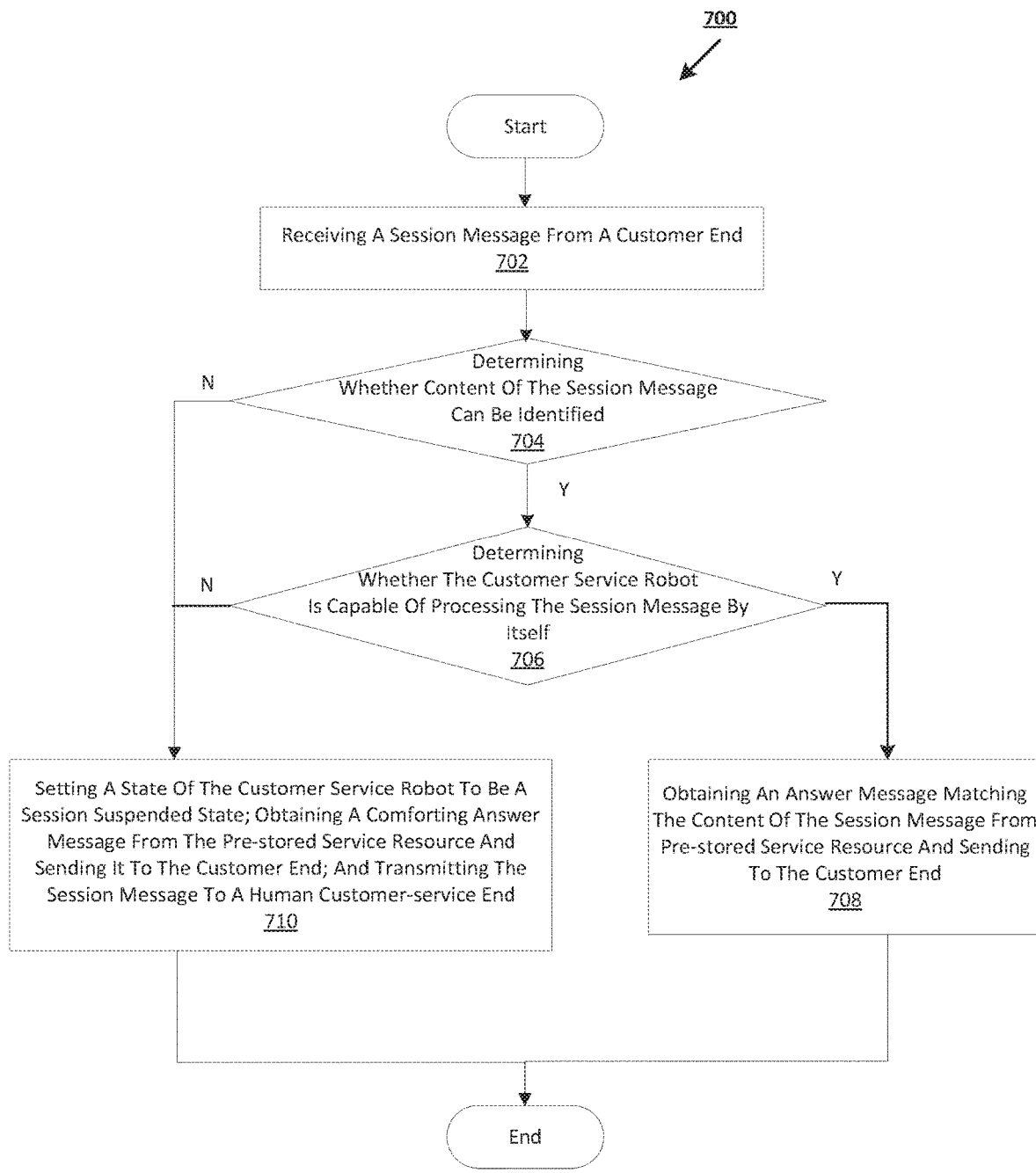
FIG. 7 illustrates a flowchart of another exemplary embodiment of a method for providing customer service by a customer service system consistent with embodiments of the present disclosure.

FIG. 7 is a flow chart of another exemplary method 700 for providing customer service by a customer service system consistent with embodiments of the disclosure. As shown in FIG. 7, at step 702, a customer service robot 104 receives a session message from a customer end 102.

At step 704, the customer service robot determines whether content of the session message can be identified. If it can identify the content of the session message, the customer service robot proceeds to step 706, or otherwise, it proceeds to step 710.

At step 706, the customer service robot determines whether it is capable of processing the session message by itself based on the content of the session message. If it is determined that the customer service robot is capable of processing the session message by itself, the customer service robot determines proceeds to step 708, or otherwise, it proceeds to step 710.

In some embodiments, the customer service robot cannot identify the session message. For example, the session message may include a video or a picture which has a relatively large amount of information or is relatively complicated, and it is beyond the ability of the customer service robot to identify the session message. In some embodiments, although the customer service robot can identify the content of the session message, the customer service robot may find that it is beyond its ability to process the session message by itself. If the customer service robot is capable of processing the session message by itself, it performs step 708. That is, the customer service robot may process the session message by itself. If the customer service robot is not capable of processing the session message by itself or cannot identify the content of the session message, it performs step 710.

At step 708, the customer service robot obtains, from a pre-stored service resource, an answer message matching the content of the session message. It further transmits the answer message to the customer end. In some embodiments, the pre-stored service resource may include language experience data and customer service resource data. After identifying the content of the session message, the customer service robot may extract an answer message matching the content of the session message from the pre-stored language experience data or the pre-stored customer service resource data. For example, if the identified content of the session message is "hello," the answer message that is extracted from the pre-stored language experience data and matches the identified content of the session message may be "hello, I am available, and what can I do for you?" For another example, if the identified content of the session message is "has the blue dress I bought been sent out?", the customer service robot may extract purchase order information of the customer from the language experience data and the customer service resource data to obtain the answer information "hello, your dress has been sent out." In some embodiments, the answer information may further contain logistics information of the purchase order of the customer.

At step 710, the customer service robot sets its state for a session service with the customer end to be a session suspended state. It also extracts a comforting answer message matching the content of the session message from the pre-stored service resource and sends the message to the customer end. In some embodiments, the customer service robot may also transmits to the human customer-service end the session message, which the customer service robot is not capable of processing by itself or cannot identify its content.

In some embodiments, the customer service robot may not be capable of processing or identifying the content of the session message by itself. On one hand, the customer service robot may set its state for the session service with the customer end to be the session suspended state. In this way, if receiving any session message from the customer end subsequently, the customer service robot may no longer process any session message. This may save processing resource of the customer service robot. On the other hand, the customer service robot extracts the comforting answer message matching the content of the session message, and sends the message to the customer end to comfort the customer. In some embodiments, the customer service robot also transmits to the human customer-service end the session message, which the customer service robot cannot process by itself or cannot identify the content thereof, for a human customer service representative to process. When the customer service robot is in the session suspended state and the customer service representative is processing session messages, the customer service robot may forward session messages received from the customer end to the human customer-service end, and transmit answer messages received from the human customer-service end to the customer end, without identifying or processing these session messages.

The comforting answer message represents a message which may eliminate uneasiness and negative emotion of the customer and make the customer in a stable mood. The comforting answer message may be presented by words in a natural language, a picture, a voice, or a piece of music. In some embodiments, to avoid anxiousness of the customer caused by failing to receive a reasonable answer within a reasonable time period, the customer service robot may adapt the comforting answer message to represent that the customer service representative is searching for an answer to the session message. For example, if the identified content of the session message is "I want to buy a pair of men's shoes," and the customer service robot determines it is not capable of processing the session message by itself, the customer service robot may set its state for the session service with the customer end to be the session suspended state, and determine the comforting answer message matching the content of the session message to be "OK. Please wait for a moment. I shall look for a pair of shoes suitable for you." Then the customer service robot sends the comforting answer message to the customer end, so that the customer receives an answer in time and is patient to wait. The customer service robot also sends the session message "I want to buy a pair of men's shoes" to the human customer-service end, so that the human customer service representative can process the session message. In some embodiments, comforting answer messages corresponding to content of session messages may be preset and pre-stored. For example, to a received picture that the customer service robot cannot identify its content, the customer service robot may set the corresponding comforting answer message to "please wait for a moment and let me have a look at it."

Figure 8:
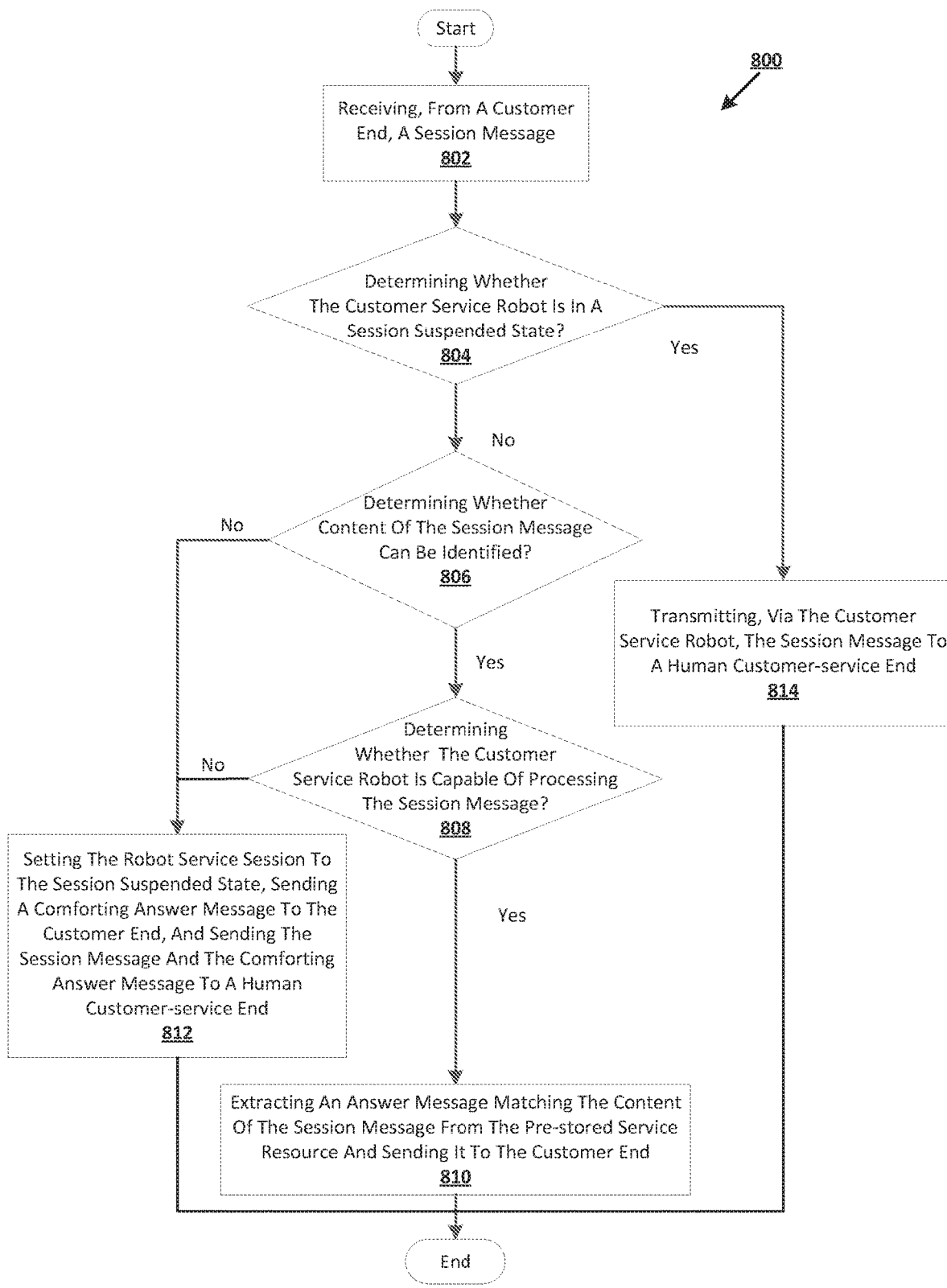
FIG. 8 is a flowchart of yet another exemplary embodiment of a method for providing customer service by a customer service system, consistent with embodiments of the present disclosure.

FIG. 8 is a flowchart of yet another exemplary embodiment of a method 800 for providing customer service by a customer service system, according to embodiments of the present disclosure. As shown in FIG. 8, at step 802, a customer service robot 104 receives a session message from a customer end 102.

At step 804, the customer service robot determines whether its state for a session service with the customer end is in a session suspended state. If the state is a session suspended state, the customer service robot proceeds to step 814. Or if the state is not a session suspended state, the customer service robot proceeds to step 806.

In some embodiments, to save processing resource of the customer service robot and to realize the cooperation of the customer service robot and a human customer service representative, the customer service robot may set its state to a session state or a non-session-suspended state, when the customer service robot is capable of processing the received session message by itself. The customer service robot may set its state to a session suspended state, when the customer service robot is not capable of processing the session message from the customer end by itself or cannot identify content of the session message.

If the customer service robot determines that its state for the session service with the customer end is a non-session-suspended state, it proceeds to step 806. If the customer service robot determines that its state for the session service with the customer end is a session suspended state, the customer service robot may not answer questions from the customer end by itself in subsequent session services with the customer end, and send the questions from the customer end to a human customer-service end to ask the customer service representative to process them. That is, the customer service robot performs step 814.

Among below steps, the customer service robot itself performs steps 806 to 812, and may trigger a human customer service representative to intervene at step 814.

At step 806, the customer service robot determines whether it can identify content of the session message. If it determines that the content of the session message can be identified, the customer service robot proceeds to step 808. Or if it determines that the content of the session message cannot be identified, the customer service robot proceeds to step 812.

In some embodiments, the content of the session message may be identified by the customer service robot, using different identification methods according to the form of the session message as described above. If the content of the session message can be identified, step 808 is performed. In some embodiments, the session message cannot be identified. For example, the session message may include a video or a picture which has a relatively large amount of information or is relatively complicated, and it is beyond the ability of the customer service robot to identify the session message. In this situation, step 812 may be performed.

At step 808, the customer service robot determines whether it is capable of processing the session message by itself. If it determines that it is capable of processing the session message by itself, the customer service robot proceeds to step 810. Or if it determines that it is not capable of processing the session message by itself, the customer service robot proceeds to step 812.

The customer service robot determines whether it is capable of processing the session message by itself based on the identified content of the session message. In some embodiments, the customer service robot determines whether it is capable of processing the session message by itself further based on pre-stored service resource, which includes language experience data and customer service resource data. In some embodiments, the customer service robot determines whether it is capable of answering the content of the session message by itself according to the language experience data. If capable of answering the content of the session message according to the language experience data, the customer service robot determines that it is capable of processing the session message by itself. If not capable of answering the content of the session message according to the language experience data by itself, the customer service robot further determines a type of scenario which the content of the session message belongs to. If the type of scenario is determined to be one of predetermined types of scenario, the customer service robot determines that it is capable of processing the session message by itself.

In some embodiments, to improve the customer service robot's ability of processing the session message by itself, the customer service robot may be trained with big data, to identify the type of scenario the session message belongs to. In some embodiments, session messages between the customer service robot and customer ends may be classified according to scenarios to obtain the customer service resource data of different types of scenarios (i.e., the predetermined types of scenario mentioned above).

In some embodiments, during the scenario classification process and the machine training process, the session messages may not only include session messages between the customer service robot and customer ends, but also include session messages between the customer service representative and customer ends. In embodiments of the present disclosure, the customer service representative may not be considered as an independent individual but as an element in a particular scenario during a whole service. In this way, a working mode for a customer service provider including the customer service robot and the customer service representative is reconstructed. Working efficiency of the customer service representative and service experience of customers may be effectively improved, especially when there are a large amount of customers. In some embodiments, elements in a scenario may include a customer, a customer service provider, and content of session messages between the customer and the customer service provider corresponding to different service scenarios.

At step 810, the customer service robot extracts or obtains an answer message matching the content of the session message from pre-stored service resource, and sends the answer message to the customer end. As described above, the pre-stored service resource may include language experience data and customer service resource data. In some embodiments, if the customer service robot determines that it is capable of answering the session message by itself according to the language experience data, the customer service robot extracts an answer message matching the content of the session message from the language experience data. Or if the customer service robot determines that it is not capable of answering the session message by itself according to the language experience data, the customer service robot extracts an answer message, which matches the content of the session message and belongs to a same type of scenario with the content of the session message, from the customer service resource data.

For example, if the identified content of the session message is "hello," the customer service robot may extract from the pre-stored language experience data an answer matching the identified content of the session message: "hello, I am available, and what can I do for you?" For another example, if the identified content of the session message is "has the blue dress I bought been sent out?", the customer service robot may extract purchase order information of the customer from the language experience data and the customer service resource data to obtain the answer information "hello, your dress has been sent out." In some embodiments, the answer information may further contain logistics information of the purchase order of the customer.

At step 812, the customer service robot sets its state for a session service with the customer end to a session suspended state. It may also send a comforting answer message to the customer end. In some embodiments, if it can identify the content of the session message, the customer service robot may obtain the comforting answer message matching the content of the session message. Further, the customer service robot may transmit the session message and the comforting answer message to a human customer-service end. Based on step 812, the customer service robot can complete a procedure of switching to the session suspended state to realize the cooperation of the customer service robot and the customer service representative. A detailed application scenario is provided above.

In some embodiments, the customer service robot may transmit to the human customer-service end the comforting answer message, as well as the session message that the customer service robot is not capable of processing by itself or cannot identify the content of the message. In this way, a human customer service representative can see the comforting answer message that the customer service robot sends to the customer end and may reply to the customer based on the comforting answer message to retain coherence and consistency of answers. Therefore, consistent service experience may be enhanced and user experience of the customer may have improved.

At step 814, the customer service robot transmits the session message to a human customer-service end. In some embodiments, when it is in a session suspended state, the customer service robot may only transmit the session message and not process the session message by itself. The customer service robot may send session messages received from the customer end to the human customer-service end and send answer messages received from the human customer-service end to the customer end, so that the customer service representative intervenes to process the session messages. That is to say, the customer service robot only transmits the session message without identifying, processing, or answering the session message when the customer service robot is in the session suspended state. This may save service resource of the customer service robot.

In some embodiments, when it receives a session message from the customer end, the customer service robot first determines whether it is in the session suspended state. If not in the session suspended state, the customer service robot identifies the content of the session message. If in the session suspended state, a customer service representative interacts with the customer through the human customer-service end. In this way, the customer service representative and the customer service robot may work more cooperatively. On one hand, when in the session suspended state, the customer service robot transmits the session message to the human customer-service end without any processing, which may save service resource of the customer service robot. On the other hand, the customer service robot only works when it is not in the session suspended state. Thus, priority of the customer service representative is higher than that of the customer service robot. And the customer service robot is prevented from taking over a session during a halfway. As a result, the customer may have consistent service experience, and user experience of customers may be improved.

In some embodiments, to relieve anxiousness of the customer during a waiting process, when the customer service robot is in a session suspended state, if no answer message is received from the human customer-service end (i.e., the customer service representative has not intervened to process the session message), the customer service robot identifies the content of the session message received from the customer end, and obtains a comforting answer message matching the content of the session message from the pre-stored service resource if the content of the session message can be identified. Besides, after receiving a session message from the human customer-service end, i.e., after the customer service representative intervenes, during the interaction between the customer service representative and the customer, the customer service robot may not identify, process, or answer the session message by itself, but only transmits session messages between the human customer-service end and the customer end.

In some embodiments, if it is determined that the session between the customer end and the human customer-service end is finished, the customer service robot returns its state for the session service with the customer end to be a session state, i.e., the non-session-suspended state. When the customer service representative finishes intervening, the customer service robot switches back to a state that the customer service robot can serve the customer. In this way, transition between the customer service representative and the customer service robot without perceived pass is realized, and this may further improve service experience of the customer. In some embodiments, there are many ways for the customer service robot to determine that the session between the customer end and the human customer-service end is finished. In some embodiments, the customer service robot determines whether a time period within which no session message is transmitted between the customer end and the human customer-service end reaches a predetermined duration, and if the time period reaches the predetermined duration, the customer service robot may determine that the session between the customer end and the human customer-service end is finished. In some embodiments, if a session finish signal is detected from the human customer-service end, the customer service robot may determine that the session between the customer end and the human customer-service end is finished. In some embodiments, the human customer-service end may send out the session finish signal if it is detected that the human customer-service end is closing a session window. In some embodiments, the human customer-service end may send out the session finish signal if a session message sent out by the human customer-service end contains content indicating the session is finished. It should be understood that methods in the above different embodiments may be used conjunctively according to practical requirements.

The customer service robot may determine that the customer service representative has finished intervening, based on: determining a time period within which no session message is transmitted between the customer end and the human customer-service end reaches a predetermined duration; detecting a session finish signal (from the human customer-service end) that is sent out when the session window is closed; or detecting a session finish indication when the session message sent out by the human customer-service end contains content indicating the session is finished. This may simplify operations, reduce a workload of the customer service representative, and provide convenience for the customer service representative.

In some embodiments, if the customer service robot is in a session state in a session service with the customer end, and a session message is received from the human customer-service end, the customer service robot may switch its state in the session service with the customer end to the session suspended state and transmit session messages between the customer end and the human customer-service end. Therefore, during the cooperation of the customer service representative and the customer service robot, the priority of the customer service representative may be higher. The customer service representative may intervene actively at any time if necessary, to provide better service for the customer.

It should be understood that a processing procedure of one session message received from the customer end is described above, and the customer service robot may process any received session messages following the above processing procedure.

To make those skilled in the art better understand and realize the present disclosure, a specific session scenario is described in detail below.

Figure 9:
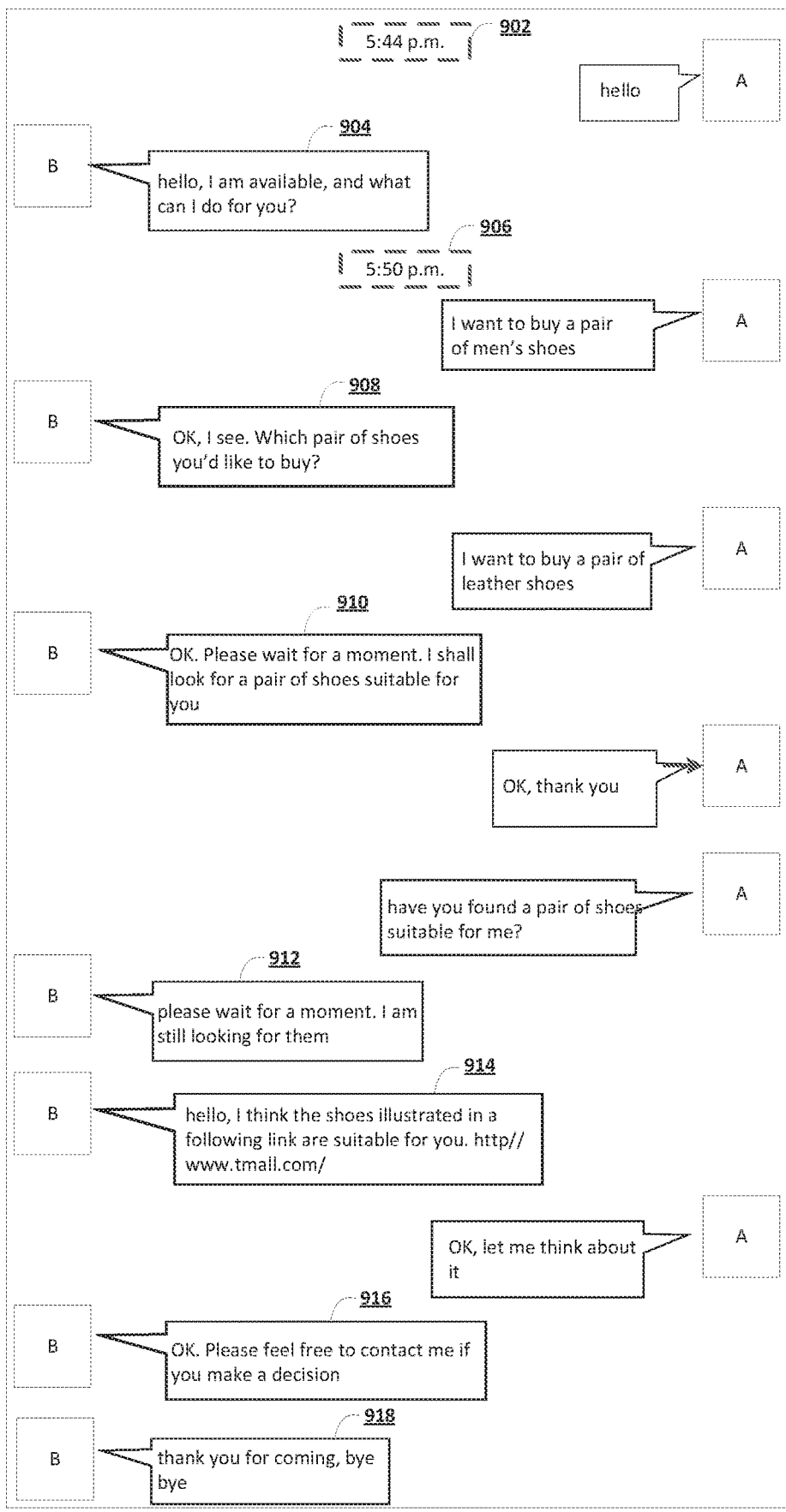
FIG. 9 illustrates a schematic diagram of an exemplary interaction interface at a customer end, consistent with embodiments of the present disclosure.

FIG. 9 schematically illustrates a structural diagram of an interaction interface at a customer end 102 according to embodiments of the present disclosure. Referring to FIG. 9, the interaction interface presents a session between a customer A and a customer service provider B. The interaction interface may be illustrated at a customer end 102 for customer A. In a customer service system, both a customer service robot 104 and a customer service representative at a human customer-service end 106 serve as a customer service provider B, which is presented to customer A during the session. Thus, customer service provider B may be customer service robot 104 or a customer service representative at human customer-service end 106.

In FIG. 9, boxes A and B are used to represent identification information of the customer A and the customer service provider B, respectively. In some embodiments, the boxes A and B may be presented by customized avatars (i.e., images or icons representing users) and nicknames of the customer A and the customer service provider B, respectively. Time information "5:44 p.m." and "5:50 p.m." in dotted boxes 902 and 906 represents a time point when the session occurs. Session messages at a right side of the interface are those sent by the customer A, and session messages at a left side of the interface are answer messages sent by the customer service provider B. Hereinafter, a processing procedure of the customer service system during a session interaction process is described in detail.

Customer A sends a session message "hello" through the customer end. The customer service robot determines that it is not in a session suspended state, and identifies content of the session message. After the identification, the customer service robot determines whether it is capable of answering the session message according to language experience data. If it is determined that the customer service robot is capable of answering the session message according to the language experience data, the customer service robot extracts an answer message "Hello, I am available, and what can I do for you?" (904) matching the session message from the language experience data and sends to the customer end for the customer A. After receiving answer message 904, customer A may answer "I want to buy a pair of men's shoes." In response, the customer service robot determines whether it is capable of identifying content of the session message "I want to buy a pair of men's shoes" and processing the message. If it is capable of identifying and processing, the customer service robot then identifies the content of the session message and extract, from pre-stored service resource, an answer message "OK, I see. Which pair of shoes you'd like to buy?" (908) matching the session message. Subsequently, the customer service robot sends answer message 908 to customer A.

Afterwards, customer A sends another session message "I want to buy a pair of leather shoes" through the customer end. After the customer service robot determines that it is not in the session suspended state and it can identify the content of the session message, the customer service robot may determine that it is not capable of processing the session message by itself and sends a comforting answer message "OK Please wait for a moment. I shall look for a pair of shoes suitable for you" (910) matching the session message "I want to buy a pair of leather shoes" to the customer end of the customer A. Besides, the customer service robot may set its state in a session service with the customer end of customer A to be the session suspended state, and sends the session message "I want to buy a pair of leather shoes" to the human customer-service end, so that the customer service representative can process the session message. Afterwards, customer A replies a session message "OK, thank you".

In some embodiments, the customer service representative may be not in his/her seat, or have too many customers to serve, thus, he/she cannot intervene to process the session message timely. In this situation, the customer A may send a session message "Have you found a pair of shoes suitable for me?" through the customer end after a time period. After receiving this session message, the customer service robot determines it is in the session suspended state, identifies content of the session message, and extracts and sends to the customer end for the customer A a comforting answer message "Please wait for a moment. I am still looking for them" (912) matching the session message "Have you found a pair of shoes suitable for me?"

Afterward, the customer service representative intervenes and sends a session message "Hello, I think the shoes illustrated in a following link are suitable for you. http//www.tmall.com/" (914) through the human customer-service end. The customer service robot directly sends the session message received from the customer service representative to the customer end of the customer A without any processing. The customer A receives the session message and replies another session message "OK, let me think about it." After receiving the session message "OK, let me think about it" at the human customer-service end, the customer service representative replies session messages "OK. Please feel free to contact me if you make a decision" (916) and "Thank you for coming, bye bye" (918) successively.

Based on the above procedures, session messages 904 and 908 are answered by the customer service robot itself after processing session messages received from the customer end. Session messages 910 and 912 are comforting answer messages generated by the customer service robot. And session messages 914, 916, and 918 are answered by the customer service representative.

It should be understood that, in some embodiments, session messages 916 and 918 may be answer messages generated by the customer service robot itself. For example, if the customer service robot doesn't receive any answer message from the human customer-service end within a predetermined time period after receiving the session message "OK, let me think about it" from the customer end, the customer service robot may determine that the customer service representative finishes intervening. And the customer service robot then identifies content of the session message. In some embodiments, after the identification of the content of the session message, the customer service robot may reply the customer with answer messages "OK. Please feel free to contact me if you make a decision" (916) and "Thank you for coming, bye bye" (918) according to pre-stored language experience data. In some embodiments, after the identification of the content of the session message, the customer service robot may determine it is not capable of answering the session message by itself according to the language experience data. Thus, the customer service robot determines a type of scenario the session message belongs to, extracts answer messages "OK Please feel free to contact me if you make a decision" (916) and "Thank you for coming, bye bye" (918) matching the session message from pre-stored service resource according to the type of scenario, and sends the answer messages to the customer end of customer A successively.

Figure 10:
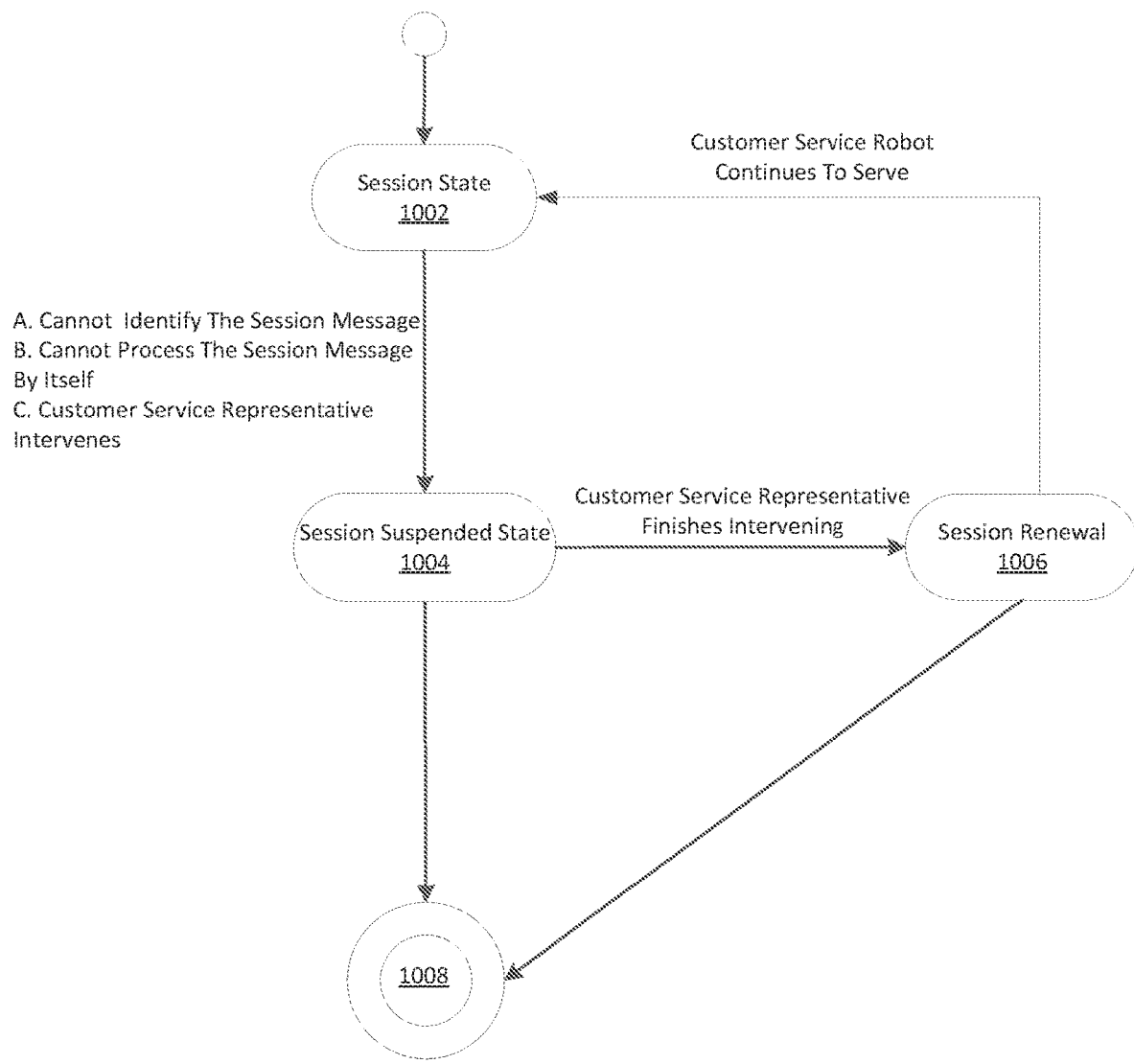
FIG. 10 illustrates a chart diagram for an exemplary session state switching procedure during a customer service providing process, consistent with embodiments of the present disclosure.

FIG. 10 illustrates a state chart diagram for an exemplary session state switching procedure during a customer service providing process according to embodiments of the present disclosure. The switching procedure for a state of a customer service robot 104 in a session service during the customer service providing process is described in detailed as below.

For example, an initial state of the customer service robot is a session state 1002 (i.e., non-session-suspended state). The customer service robot may change the state to a session suspended state 1004 if: (a) the customer service robot cannot identify content of a received session message; (b) the customer service robot cannot process the session message by itself; or (c) a human customer service representative intervenes to process the session message.

When it is in the session suspended state 1004, if the customer service robot detects a signal representing that the customer service representative finishes intervening, the customer service robot may execute a session renewal 1006. By the session renewal 1006, the customer service robot may continue to provide customer service by itself. That is, it switches to session state 1002 to provide customer service to customers by itself. During session suspended state 1004 or when the customer service representative finishes intervening, if no new session message is received from the customer end, the customer service robot determines that the whole session procedure is finished. The customer service robot sets its state to a session finished state 1008.

It will now be appreciated by one of ordinary skill in the art that the above illustrated methods can be altered to delete steps, change the order of steps, or include additional steps. The methods disclosed herein may be implemented as a computer program product, i.e., a computer program tangibly embodied in an information carrier, e.g., in a machine readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

A portion or all of the methods disclosed herein may also be implemented by an application specific integrated circuit (ASIC), a field-programmable gate array (FPGA), a complex programmable logic device (CPLD), a printed circuit board (PCB), a digital signal processor (DSP), a combination of programmable logic components and programmable interconnects, single central processing unit (CPU) chip, a CPU chip combined on a motherboard, a general purpose computer, or any other combination of devices or modules capable of providing intelligent customer service disclosed herein.

In the preceding specification, the invention has been described with reference to specific exemplary embodiments. It will however, be evident that various modifications and changes may be made without departing from the broader spirit and scope of the invention as set forth in the claims that follow. The specification and drawings are accordingly to be regarded as illustrative rather than restrictive sense. Other embodiments of the invention may be apparent to those skilled in the art from consideration of the specification and practice of the invention disclosed herein.

What is claimed is:

1. A customer service robot, comprising:
a machine training unit to perform machine training for big data to the customer service robot, so that the customer service robot is capable of identifying a type of scenarios to which session messages belong,
wherein the identified type of scenarios is one of a plurality of types of scenarios, which are obtained by classifying the session messages between a customer service provider and at least one customer-end device according to scenarios;
a message interactor to:
establish a session between the customer service robot and a customer-end device, receive a session message from the customer-end device,
transmit an answer message matching content of the session message to the customer-end device, the answer message comprising a comforting answer message when the customer service robot in a session service with the customer-end device is in a session suspended state, and
upon determining that the customer service robot is in the session suspended state, establish a session between a human customer-service device and the customer-end device, forward the received session message to the human customer-service device, and transmit an answer message received from the human customer-service device to the customer-end device;
a session message processor, coupled to the machine training unit and the message interactor, to:

identify the content of the session message received by the message interactor based on determining that the customer service robot is not in the session suspended state, ascertain whether the customer service robot is capable of processing the session message based on the identified content of the session message, upon ascertaining that the customer service robot is capable of processing the session message by itself, extract the answer message matching the identified content of the session message from a first type of data included in a pre-stored service resource and instruct the message interactor to transmit the answer message to the customer-end device, and upon ascertaining that the customer service robot is not capable of processing the session message by itself or cannot identify the content of the session message, obtain a comforting answer message matching the session message from a second type of data included in the pre-stored service resource, and transmit the comforting answer message to the customer-end device, wherein the comforting answer message includes at least a portion of the content of the session message and is obtained according to the content of the session message, and the first type of data is different from the second type of data; and a state controller, coupled to the session message processor, if a predetermined condition for session suspension is met during the processing of the session message by the session message processor, the state controller is configured to set a state of the customer service robot to be a session suspended state when the customer service robot is in a session service with the customer-end device, and the customer service robot is configured to remain in another session service with another customer-end device when the customer-end device is in the session service with the customer service robot in the session suspended state.

2. The customer service robot according to claim 1, further comprising a session finish detector to determine that a customer service representative has finished intervening, based on at least one of the following:

determining a time period within which no session message is transmitted between the customer-end device and the human customer-service device reaches a predetermined duration;

detecting a session finish signal from the human customer-service device that is sent out when a session window is closed; or detecting a session finish indication when the session message sent out by the human customer-service device contains content indicating the session is finished.

3. The customer service robot according to claim 1, wherein the customer service robot transmits the session message along with the comforting answer message to the human customer-service device, if it is determined that the customer service robot is not capable of processing the received session message or cannot identify the content of the received session message.

4. The customer service robot according to claim 1, wherein during processing the received session message by the customer service robot itself, the customer service robot switches its state to the session suspended state based on as least one of the following:

determining that the predetermined condition for session suspension is met; or receiving the session message from the human customer-service device.

5. The customer service robot according to claim 1, wherein upon determining that the predetermined condition is met, the customer service robot automatically switches to the session suspended state that a customer service representative provides customer service for a customer.

6. The customer service robot according to claim 1, wherein during an interaction between a customer service representative and a customer, the customer service robot does not identify, process, or answer the session message by itself, but only transmits session messages between the human customer-service device and the customer-end device.

7. The customer service robot according to claim 1, wherein the state controller is further configured to:

set a state of the customer service robot under the condition that the customer service robot is capable of processing the received session message by itself being a session state or a non-session-suspended state; or set the session suspended state of the customer service robot under the condition that the customer service robot is not capable of processing the received session message by itself or cannot identify the content of the received session message being the session suspended state.

8. The customer service robot according to claim 1, wherein if it is determined that the session between the customer-end device and the human customer-service device is finished, the customer service robot switches its state for the session with the customer-end device to be a non-session-suspended state, which enables the customer service robot to continue serving a customer.

9. The customer service robot according to claim 1, further comprising:

a message content identifier to identify the content of the session message using different identification methods according to a form of the session message.

10. The customer service robot according to claim 1, further comprising:

a first detection sub-unit to detect whether an idle time period of the message interactor communicating with the human customer-service device reaches a predetermined duration, and determine that the session between the customer-end device and the human customer-service device is finished if the idle time period reaches the predetermined duration.

11. A customer service robot, comprising: a machine training unit to perform machine training for big data to the customer service robot, so that the customer service robot is capable of identifying a type of scenarios to which session messages belong, wherein the identified type of scenarios is one of a plurality of types of scenarios, which are obtained by classifying the session messages between a customer service provider and at least one customer-end device according to scenarios; a message interactor to: establish a session between the customer service robot and a customer-end device, receive a session message from the customer-end device, transmit an answer message matching content of the session message to the customer-end device, the answer message comprising a comforting answer message when the customer service robot in a session service with the customer-end device is in a session suspended state, and upon determining that the customer service robot is in the session suspended state, establish a session between human customer-service device and the customer-end device, forward the received session message to the human customer-service device, and transmit an answer message received from the human customer-service device to the customer-end device; and a session message processor, coupled to the machine training unit and the message interactor, to: identify the content of the session message received by the message interactor based on determining that the customer service robot is not in the session suspended state, ascertain whether the customer service robot is capable of processing the session message based on the identified content of the session message, upon ascertaining that the customer service robot is capable of processing the session message by itself, extract the answer message matching the identified content of the session message from a first type of data included in a pre-stored service resource and instruct the message interactor to transmit the answer message to the customer-end device, and upon ascertaining that the customer service robot is not capable of processing the session message by itself or cannot identify the content of the session message, obtain a comforting answer message matching the session message, from a second type of data included in the pre-stored service resource, and transmit the comforting answer message to the customer-end device, wherein the comforting answer message includes at least a portion of the content of the session message and is obtained according to the content of the session message, and the first type of data is different from the second type of data; and a state controller, coupled to the session message processor, if a predetermined condition for session suspension is met during the processing of the session message by the session message processor, the state controller is configured to set a state of the customer service robot to be a session suspended state when the customer service robot is in a session service with the customer-end device, and the customer service robot is configured to remain in another session service with another customer-end device when the customer-end device is in the session service with the customer service robot in the session suspended state;

wherein the customer service robot is configured to: provide customer services to a plurality of customer-end devices; interact with a plurality of human customer-service devices; upon determining that the plurality of customer-end devices and the plurality of human customer-service devices are in a session state and that the customer service robot is not capable of processing a first session message received from one of the plurality of customer-end devices or cannot identify content of the first session message, send the first session message and a comforting answer message corresponding to the first session message to a particular one of the plurality of human customer-service devices, the particular one of the plurality of human customer-service devices having the fewest tasks among the plurality of human customer-service devices.

12. A customer service robot, comprising: a machine training unit to perform machine training for big data to the customer service robot, so that the customer service robot is capable of identifying a type of scenarios to which session messages belong, wherein the identified type of scenarios is one of a plurality of types of scenarios, which are obtained by classifying the session messages between a customer service provider and at least one customer-end device according to scenarios; a message interactor to: establish a session between the customer service robot and a customer-end device, receive a session message from the customer-end device, transmit an answer message matching content of the session message to the customer-end device, the answer message comprising a comforting answer message when the customer service robot in a session service with the customer-end device is in a session suspended state, and upon determining that the customer service robot is in the session suspended state, establish a session between human customer-service device and the customer-end device, forward the received session message to the human customer-service device, and transmit an answer message received from the human customer-service device to the customer-end device; and a session message processor, coupled to the machine training unit and the message interactor, to: identify the content of the session message received by the message interactor based on determining that the customer service robot is not in the session suspended state, ascertain whether the customer service robot is capable of processing the session message based on the identified content of the session message, upon ascertaining that the customer service robot is capable of processing the session message by itself, extract the answer message matching the identified content of the session message from a first type of data included in a pre-stored service resource and instruct the message interactor to transmit the answer message to the customer-end device, and upon ascertaining that the customer service robot is not capable of processing the session message by itself or cannot identify the content of the session message, obtain a comforting answer message matching the session message, from a second type of data included in the pre-stored service resource, and transmit the comforting answer message to the customer-end device, wherein the comforting answer message includes at least a portion of the content of the session message and is obtained according to the content of the session message, and the first type of data is different from the second type of data; and a state controller, coupled to the session message processor, if a predetermined condition for session suspension is met during the processing of the session message by the session message processor, the state controller is configured to set a state of the customer service robot to be a session suspended state when the customer service robot is in a session service with the customer-end device, and the customer service robot is configured to remain in another session service with another customer-end device when the customer-end device is in the session service with the customer service robot in the session suspended state;

wherein the customer service robot is configured to: provide customer services to a plurality of customer-end devices; interact with a plurality of human customer-service devices; and upon determining that the plurality of customer-end devices and the plurality of human customer-service devices are in a session state and that the customer service robot is not capable of processing a first session message received from one of the plurality of customer-end devices or cannot identify content of the first session message, send the first session message to a particular one of the plurality of human customer-service devices, the particular one of the plurality of human customer-service devices having processed a second session message from the one of the plurality of customer-end devices before.

13. A method for providing customer services by a customer service robot, comprising:

performing machine training for big data to the customer service robot, so that the customer service robot is capable of identifying a type of scenarios to which session messages between a customer service provider and a customer-end device belong,
wherein the identified type of scenarios is one of a plurality of types of scenarios, which are obtained by classifying the session messages according to scenarios;
establishing, via a message interactor of the customer service robot, a session between the customer service robot and the customer-end device;
receiving, at the message interactor of the customer service robot, a session message from the customer-end device;
identifying, at a session message processor of the customer service robot, content of the received session message;
determining, at the session message processor, whether the customer service robot is capable of processing the received session message based on the identified content of the received session message;
upon determining that the customer service robot is capable of processing the received session message, obtaining an answer message matching the identified content of the received session message from a first type of data included in a pre-stored service resource and instructing the message interactor to transmit the answer message to the customer-end device; and
upon determining that the customer service robot is not capable of processing the received session message or cannot identify the content of the received session message, obtaining via the session message processor a comforting answer message matching the session message from a second type of data included in the pre-stored service resource, and transmitting the comforting answer message to the customer-end device, wherein the comforting answer message includes at least a portion of the content of the session message and is obtained according to the content of the session message, and the first type of data is different from the second type of data; and
if a predetermined condition for session suspension is met during the processing of the session message by the session message processor, setting, via a state controller of the customer service robot, a state of the customer service robot to be a session suspended state when the customer service robot is in a session service with the customer-end device, wherein the customer service robot remains in another session service with another customer-end device when the customer-end device is in the session service with the customer service robot in the session suspended state.

* * * * *